United States Patent
Chapman et al.

(10) Patent No.: US 9,252,902 B2
(45) Date of Patent: Feb. 2, 2016

(54) PRECISION TIMING IN A DATA OVER CABLE SERVICE INTERFACE SPECIFICATION (DOCSIS) SYSTEM

(71) Applicant: Cisco Technology, Inc., San Jose, CA (US)

(72) Inventors: John T. Chapman, Laguna Nigel, CA (US); Rakesh Chopra, Lexington, MA (US); Laurent Montini, Saint-Arnoult-en-Yvelines (FR); Michael Overcash, Lawrenceville, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/672,961

(22) Filed: Mar. 30, 2015

(65) Prior Publication Data

US 2015/0207579 A1    Jul. 23, 2015

Related U.S. Application Data

(63) Continuation of application No. 13/480,604, filed on May 25, 2012, now Pat. No. 9,014,282.

(60) Provisional application No. 61/490,680, filed on May 27, 2011.

(51) Int. Cl.
*H04J 3/06* (2006.01)
*H04J 13/16* (2011.01)
(Continued)

(52) U.S. Cl.
CPC ............ *H04J 3/0661* (2013.01); *H04J 3/0667* (2013.01); *H04J 3/0682* (2013.01); *H04J 3/0688* (2013.01);
(Continued)

(58) Field of Classification Search
CPC ..... H04L 12/2801; H04L 7/033; H04L 7/048; H04L 1/004; H04J 3/0667; H04J 3/0682; H04J 13/16; H04J 3/0638; H04J 3/0688
USPC .......................................................... 370/257
See application file for complete search history.

(56) References Cited

U.S. PATENT DOCUMENTS 7,539,208 B2    5/2009    Chapman et al.
7,688,828 B2    3/2010    Chapman et al.
(Continued)

FOREIGN PATENT DOCUMENTS

WO    0119005 A1    3/2001

OTHER PUBLICATIONS

International Search Report and Written Opinion in International Application No. PCT/US2012/039504, mailed Sep. 19, 2012.

*Primary Examiner* — Jae Y Lee
*Assistant Examiner* — Jean F Voltaire
(74) *Attorney, Agent, or Firm* — Edell, Shapiro & Finnan LLC

(57) ABSTRACT

An accurate non-Data Over Cable Service Interface Specification (non-DOCSIS) clock signal is generated at the downstream output of a DOCSIS network. In one example method, a downstream DOCSIS Timing Protocol (DTP) client in the DOCSIS network is frequency synchronized to an upstream DTP server in the DOCSIS network. DOCSIS timing information, along with one or more timing correction factors received at the DTP client, is used to time synchronize the DTP client to the DTP server. Based on the time and frequency synchronization between the DTP server and the DTP client, the clock signal is generated at the output of the DTP client in accordance with the non-DOCSIS timing protocol.

19 Claims, 33 Drawing Sheets

(51) Int. Cl.
*H04L 12/28* (2006.01)
*H04L 7/033* (2006.01)
*H04L 1/00* (2006.01)
*H04L 7/04* (2006.01)

(52) U.S. Cl.
CPC ............ *H04J 13/16* (2013.01); *H04L 12/2801* (2013.01); *H04L 1/004* (2013.01); *H04L 7/033* (2013.01); *H04L 7/048* (2013.01)

(56) References Cited

U.S. PATENT DOCUMENTS

| | | | |
|---|---|---|---|
| 7,773,594 B2 | 8/2010 | Asati et al. | |
| 2001/0033611 A1* | 10/2001 | Grimwood | H04J 3/0682 375/219 |
| 2002/0061012 A1* | 5/2002 | Thi | H04B 3/23 370/352 |
| 2004/0095963 A1* | 5/2004 | Rakib | H04J 3/0682 370/503 |
| 2004/0202202 A1* | 10/2004 | Kolze | H04J 3/0638 370/503 |
| 2006/0056323 A1* | 3/2006 | Currivan | H04J 3/0632 370/278 |
| 2009/0016475 A1* | 1/2009 | Rischar | H04J 3/0697 375/356 |
| 2009/0276542 A1* | 11/2009 | Aweya | H04J 3/0667 709/248 |

* cited by examiner

PRECISION TIMING IN A DATA OVER CABLE SERVICE INTERFACE SPECIFICATION (DOCSIS) SYSTEM

CROSS-REFERENCE TO RELATED APPLICATIONS

This application is a continuation of pending U.S. patent application Ser. No. 13/480,604, filed May 25, 2012, which claims priority to U.S. Provisional Patent Application No. 61/490,680 entitled "The DOCSIS Timing Protocol (DTP) Generating Precision Timing Services From a DOCSIS System," filed May 27, 2011. The entireties of these related applications are hereby incorporated by reference herein.

TECHNICAL FIELD

The present disclosure relates to providing timing information in a Data Over Cable Service Interface Specification (DOCSIS) system.

BACKGROUND

Timing information, in terms of frequency, phase (e.g., relative time), and absolute time of day, can be passed over an Ethernet or Internet Protocol (IP) network through the use of a variety of different protocols. Two of the most common such protocols are the Network Time Protocol (NTP) and the Institute of Electrical and Electronics Engineers (IEEE) 1588 protocol, referred to as the Precision Time Protocol (PTP).

NTP is a well established protocol, while PTP is a relatively new standard for communicating timing information. However, both NTP and PTP are packet based protocols that rely on round trip measurements and, as such, are generally referred to as Two-Way Time Transfer (TWTT) mechanisms. The accuracy of the round trip measurements is impacted by Path Delay Variation (PDV) and asymmetry.

DOCSIS is a telecommunications standard that permits the addition of high-speed data transfer to an existing cable TV (CATV) system. It is employed by many cable television operators to provide Internet access (i.e., cable Internet) over their existing hybrid fiber-coaxial (HFC) infrastructure. As a transport, the DOCSIS upstream may be unpredictable and may contain both packet delay variation (PDV) and asymmetry. This causes NTP, PTP, or any external timing protocol to lose significant accuracy when passed over or through a DOCSIS system/network.

DESCRIPTION OF EXAMPLE EMBODIMENTS

Overview

Figure 1:
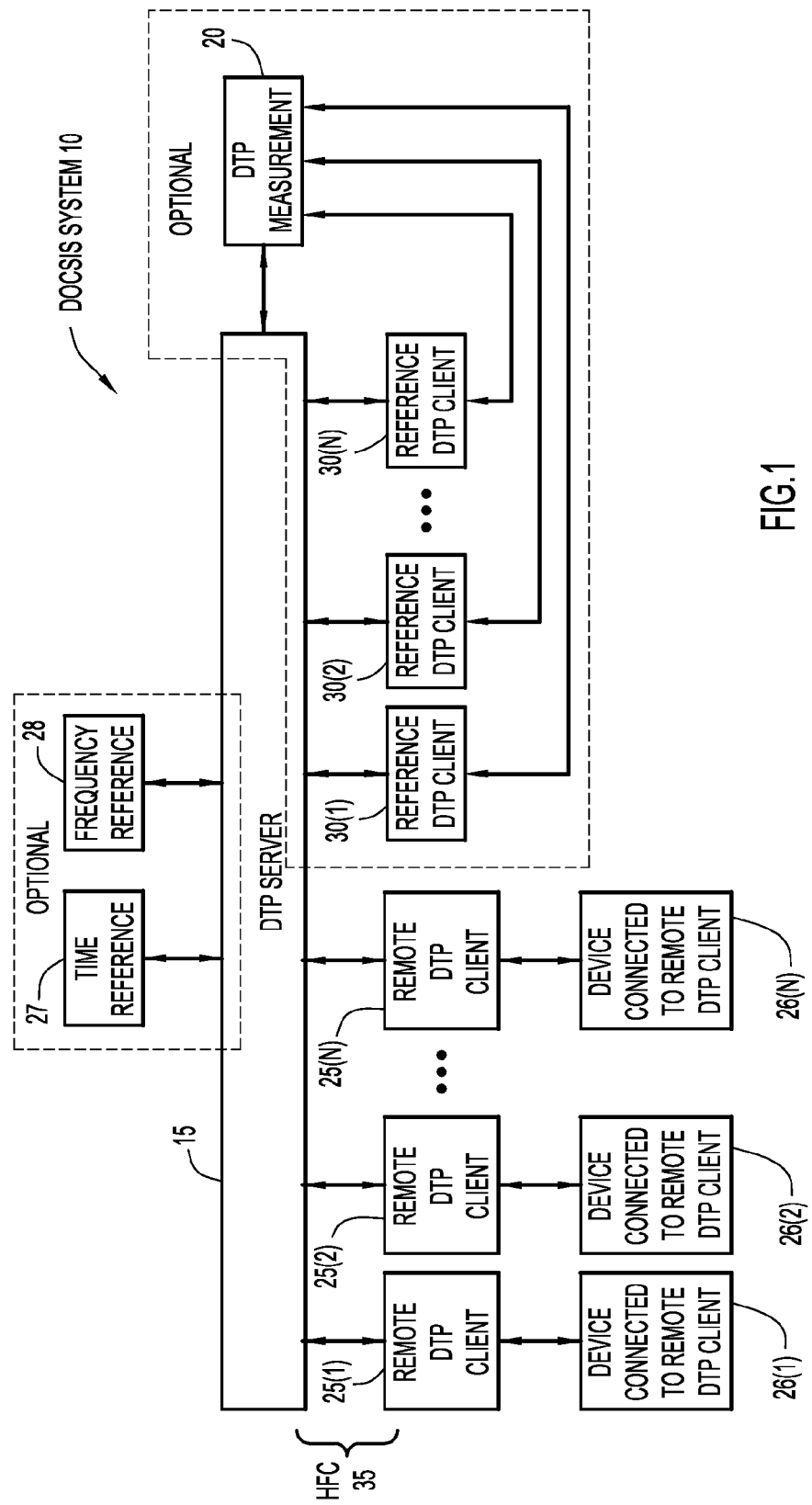
FIG. 1 is a functional block diagram of an example of a DOCSIS timing protocol (DTP) system.

A method performed in a Data Over Cable Service Interface Specification (DOCSIS) system includes frequency synchronizing a downstream DOC SIS Timing Protocol (DTP) client in a DOCSIS network to an upstream DTP server in the DOCSIS network. The DOCSIS network comprises a reference DTP client connected to the DTP server via a local connection. The method also comprises time synchronizing the DTP client to the DTP server based on DOCSIS timing information transmitted by the DTP server to the DTP client and based on one or more timing correction factors received at the DTP client, wherein the one more timing correction factors comprise DTP timestamp extensions. The time synchronizing of the DTP client to the DTP server comprises recovering, at the DTP client, a DOC SIS timestamp transmitted from the DTP server, receiving the one or more DTP timestamp extensions from the DTP server, and generating a non-DOCSIS timestamp, based on the one or more DTP timestamp extensions, for use in subsequently generating the non-DOCSIS timing signal. The method further comprises generating, based on the frequency and time of the DTP client synchronized to the DTP server, a non-DOC SIS timing signal at the output of the DTP client, calculating a time alignment difference between the DTP server and the reference DTP client, generating a time alignment correction factor based on the calculated time alignment difference, transmitting the time alignment correction factor to the DTP client, and refining the accuracy of the non-DOCSIS timestamp based on the time alignment correction factor.

Example Embodiments

Timing protocols such as PTP and NTP may run "over" or "on top of" a DOCSIS system (i.e., network). That is, these timing protocols may pass through a DOCSIS network device (i.e., router, Cable Modem Termination System (CMTS), etc.) without any modification to the DOCSIS network device. PTP may also run "through" a DOCSIS network, meaning that a DOCSIS network device may be modified to better transport PTP. Synchronous Ethernet (SyncE) is, in general, a clock on a downstream Ethernet port that is physically synchronized to some upstream frequency source. For ease of reference herein, timing protocols such as PTP, NTP, SyncE, etc. that may run "over," "through," or "on" a DOC- SIS system are collectively and generally referred to as running "over" the DOCSIS system. Accordingly, reference to timing protocols running or passing "over" the DOCSIS system should not be considered limiting as to how the timing protocol is actually implemented in practice.

A DOCSIS system may be unpredictable and may contain both packet delay variation (PDV) and asymmetry. Because many protocols (e.g., NTP and PTP) are Two-Way Time Transfer (TWTT) mechanisms that rely on round trip measurements, the PDV and the asymmetry can cause timing errors when the timing protocols pass over the DOCSIS system. As such, in conventional arrangements, timing references (clock signals) generated at a downstream DOCSIS network device (i.e., the network device, such as a cable modem, at the downstream end of the DOCSIS systems) may be inaccurate. Examples described herein are generally directed to generating precise timing information at the output of a downstream device in a DOCSIS network. In other words, examples described herein provide precise frequency and time to an external system that is connected to, for example, the Ethernet port of a DOCSIS cable modem.

A timing protocol needs to communicate both a frequency attribute and a time attribute. The frequency element is a clock frequency (e.g., 10.24 MHz) to which the various components of a network attempt to synchronize. The time element is the time of day, a particular point in time, or a time in relation to a reference time (i.e., relative time or absolute time of day) that is used in the network. The DOCSIS protocol includes a frequency attribute in the form of a downstream baud rate, which is an accurate frequency to which the downstream cable modem synchronizes. The DOCSIS protocol also includes a time attribute in the form of a DOCSIS timestamp that is generated at the CMTS and is transmitted to the cable modem. Examples described herein utilize extensions to this DOCSIS timestamp to provide accurate timing information to a downstream client (e.g., cable modem) that, in turn, uses this information to generate and/or modify timing references. In essence, an interface is created between the underlying timing protocols (e.g., PTP, NTP, etc.) and the DOCSIS protocol in order to couple the other timing protocols in and out of the DOCSIS timing domain and relate the two such that the protocol running over the DOCSIS system has an increased accuracy which is not currently possible in conventional arrangements. These techniques are generally referred to herein as the DOCSIS Timing Protocol (DTP).

FIG. 1 is a block diagram of a DOCSIS system 10 configured to execute the DTP (i.e., to provide a DTP timing domain). DOCSIS system 10 comprises a DTP server 15 that optionally includes or cooperates with a DTP measurement module 20. The DOCSIS system 10 also comprises a plurality of remote DTP clients 25(1)-25(N). In certain examples, DOCSIS system 10 may also optionally include reference DTP clients 30(1)-30(N). The DTP server 15 is connected to the remote DTP clients 25(1)-25(N) via a Hybrid Fiber-coaxial (HFC) infrastructure 35. As described further below, DTP server 15 also optionally includes or cooperates with a time reference 27 and/or a frequency reference 28.

The DTP server 15, remote DTP clients 25(1)-25(N), and reference DTP clients 30(1)-30(N) may, in practice, take any number of different arrangements. The DTP server 15 is located at the head end of the DOCSIS system 10 and, in one example, may comprise a CMTS (e.g., CMTS (I-CMTS) or a modular CMTS (M-CMTS)) with an internal DOCSIS Timing Interface (DTI) server or that communications with an external DTI server. It is to be appreciated that DTP server 15 may comprise any number of different combinations of elements configured to provide high speed data services, such as cable Internet or voice over Internet Protocol (VoIP), to downstream devices 26(1)-26(N) via the remote DTP clients 25(1)-25(N).

FIG. 1 illustrates an example having a plurality of remote DTP clients 25(1)-25(N) and a plurality of reference DTP clients 30(1)-30(N). It is to be appreciated that examples may be implemented herein within any number of remote DTP client(s) and/or reference DTP client(s).

The remote DTP clients 25(1)-25(N) and the reference DTP clients 30(1)-30(N) may be, for example, cable modems. Remote DTP clients 25(1)-25(N) are substantially the same as reference DTP clients 30(1)-30(N) except that they are physically located at different areas in the network. More specifically, reference DTP clients 30(1)-30(N) may be located with DTP server 15 at the system head end or at a centralized location with the DTP server. In either example, the DTP clients 30(1)-30(N) are connected to the DTP server 15 via a short HFC plant (i.e., a local connection). Remote DTP clients 25(1)-25(N) are located at the customer premises (i.e., remote from the DTP server 15) and are connected to the DTP server 15 via long HFC plants.

For execution of the DTP, a number of different communications occur between DTP server 15, remote DTP clients 25(1)-25(N), and/or reference DTP clients 30(1)-30(N). These DTP communications are schematically shown in FIG. 1 using arrows which, for ease of illustration, have not been individually labeled. The details of these DTP communications are provided below. For ease of illustration, examples will be described with specific reference to the use of DTP with a single remote DTP client 25(1) and a single reference DTP client 30(1).

In general, the DTP is a series of extensions to the DOCSIS protocol and supports a variety of non-DOCSIS timing protocols (e.g., PTP, NTP, SyncE, etc.) with a much higher degree of accuracy by leveraging the internal precision timing of the DOCSIS system. With reference to FIG. 1, the DTP involves synchronization of frequency and time of the remote DTP client 25(1) with the DTP server 15. In operation, frequency synchronization is addressed by coupling the frequency signal of the remote DTP client 25(1) to the DOCSIS downstream baud clock of the DTP server 15. The frequency signal may be provided via, for example, Ethernet or any other transport mechanism now known or hereinafter developed. Time synchronization is addressed by, in one example, coupling the DOCSIS timestamp to a non-DOCSIS network timing protocol timestamp. As described below, time offset and asymmetry of the DOCSIS system are addressed through measurement, signaling, and ranging. The remote DTP client 25(1) may have an Ethernet output that supports SyncE that may have an output circuit for precise packet time stamping, and may support a non-DOCSIS network timing protocol such as PTP.

For ease of illustration, examples of the DTP will be primarily described in conjunction with a specific non-DOSCIS timing protocol, namely IEEE 1588. As is known, IEEE 1588 defines hardware and software methods for passing precise clocking through a network. More particularly, IEEE 1588 defines the Precision Time Protocol (PTP) which is a message based two-way time transfer (TWTT) protocol for synchronizing distributed nodes in time and frequency. PTP timestamps are placed in PTP message payload within, for instance, an IP packet or an Ethernet frame, and replaced or corrected as they pass through a node. It will be appreciated that examples described herein may be used in conjunction with any other timing mechanism, protocol or protocol version now know or later developed (e.g., NTP, SyncE, etc.)

The IEEE Standard 1588 version 2008 includes three different types of clocks that, in certain various arrangements, are replicated or modified in the DTP. These three DTP clocks include the ordinary clock (OC), the boundary clock (BC), and the transparent clock (TC) that can run in end-to-end or peer-to-peer mode. The grandmaster clock, which is a specific state of either ordinary or boundary clock, is the ultimate source of time in a PTP domain, transmitting timing signal from one or multiple master ports. The boundary clock is an arrangement in which the clocking is terminated at the input side slave port of a network device and regenerated at the one or more output side master ports of the network device. The slave port and master port(s) are connected by clocking circuitry. As a GM clock, a boundary clock has no defined slave port and has multiple master ports. The ordinary clock is a clock with a unique PTP port in a PTP domain and is thus at an end node (i.e., end node clock) most generally a slave node. As a GM clock, an ordinary clock has a unique master port in a PTP domain.

The transparent clock is clocking that passes through a network node. In other words, clocking, in the form of messages, are, in networking logic, not terminated in the network device but go transparently (directly) through the network device. As the packets go through the network device, the transparent clock adds a PTP correction factor to the messages on the way out in order to account for the amount of delay resulting from the path through the device. In transparent clocking, an ordinary or boundary clock device will use received PTP messages, along with all of the added correction factors, to determine the time and accordingly generate a clock. The DTP system may be executed so as to execute or play any of these three clock types. For example, in DTP, it may be possible to provide at the output of a remote DTP client 25(1) one or more of a time master or a time assisting function.

Figure 2A:
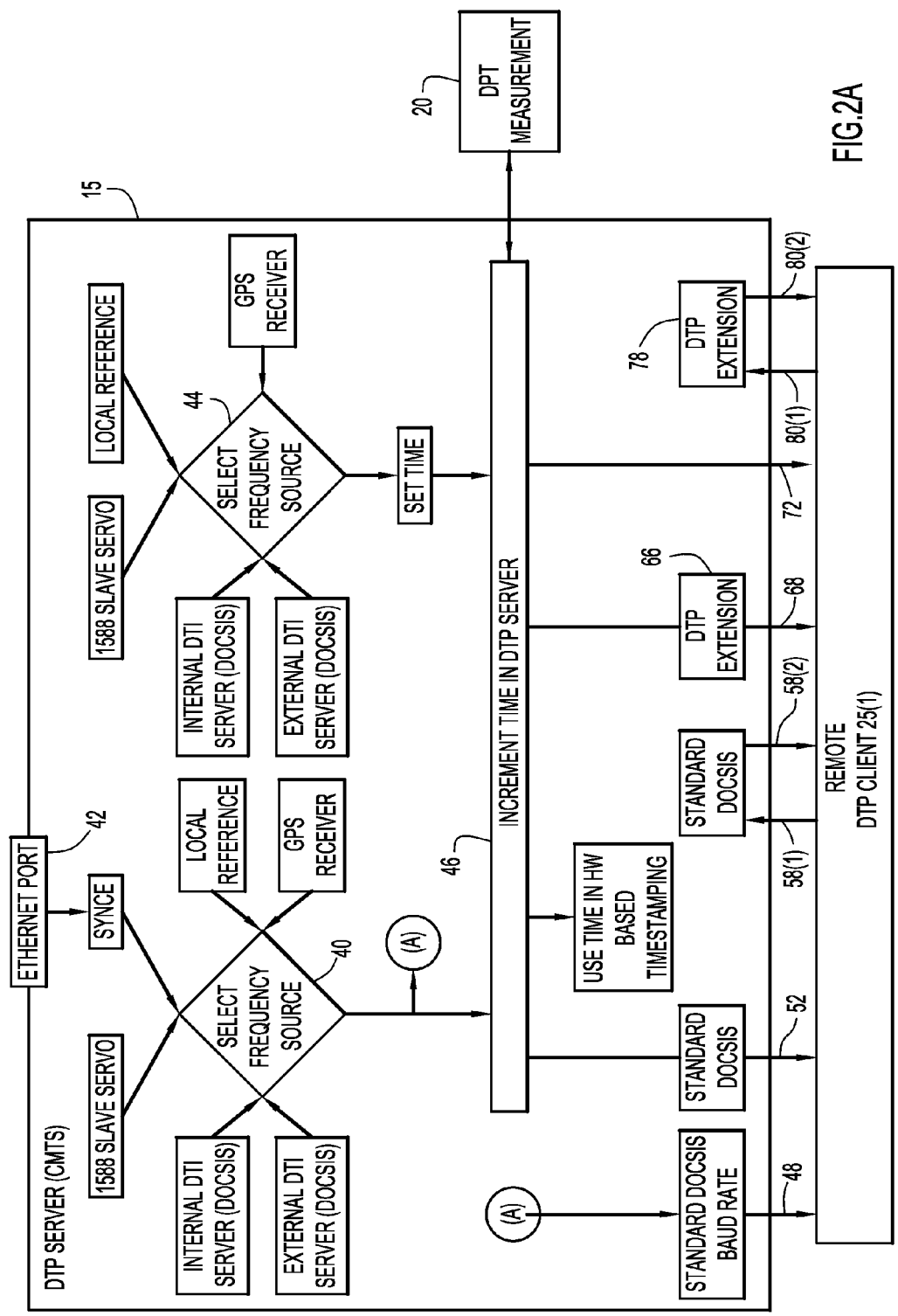
FIG. 2A is a functional block diagram illustrating the details of an example DTP server in accordance with the DTP system of FIG. 1.
Figure 2B:
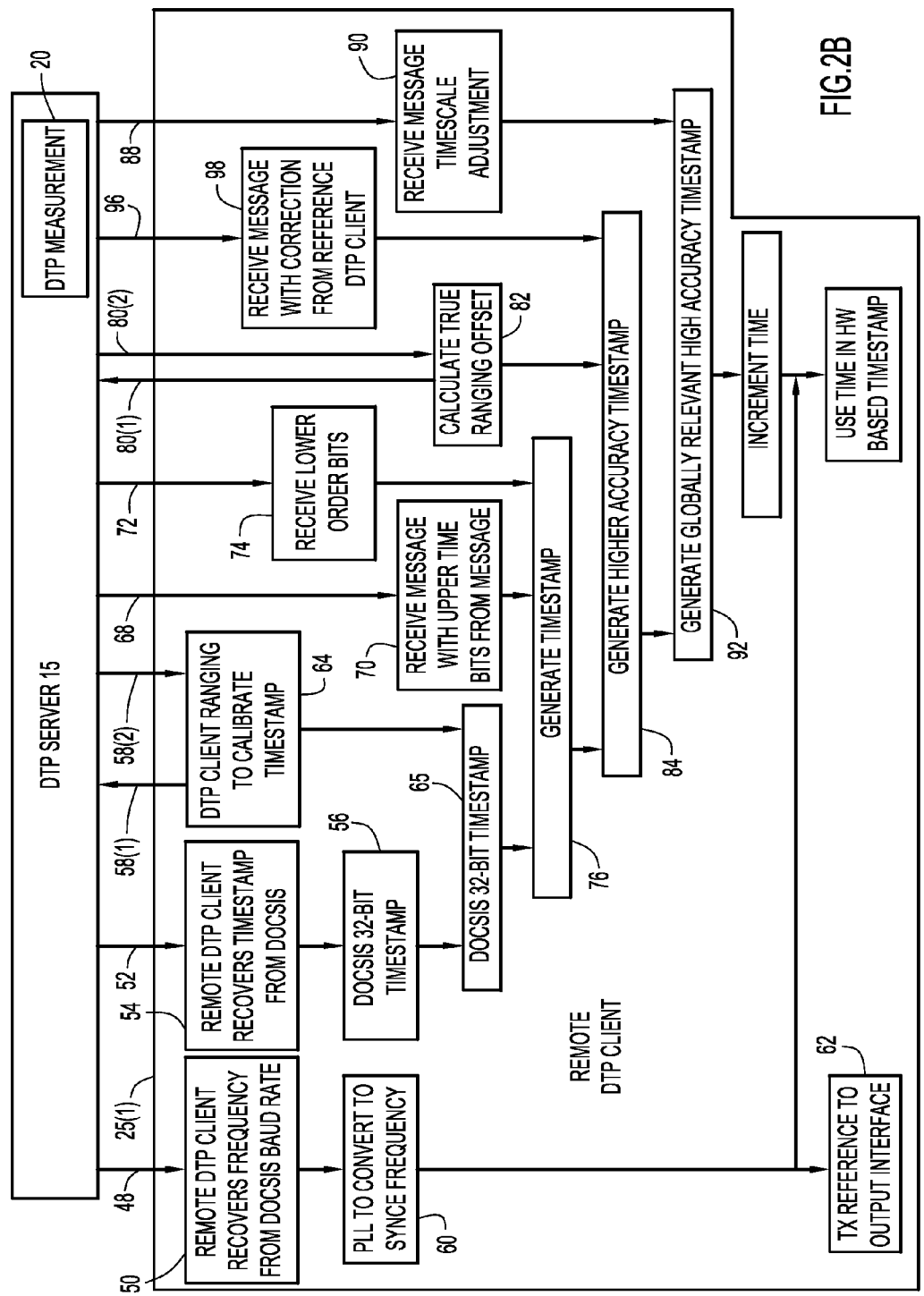
FIG. 2B is a functional block diagram illustrating the details of an example DTP client in accordance with the DTP system of FIG. 1.
Figure 2C:
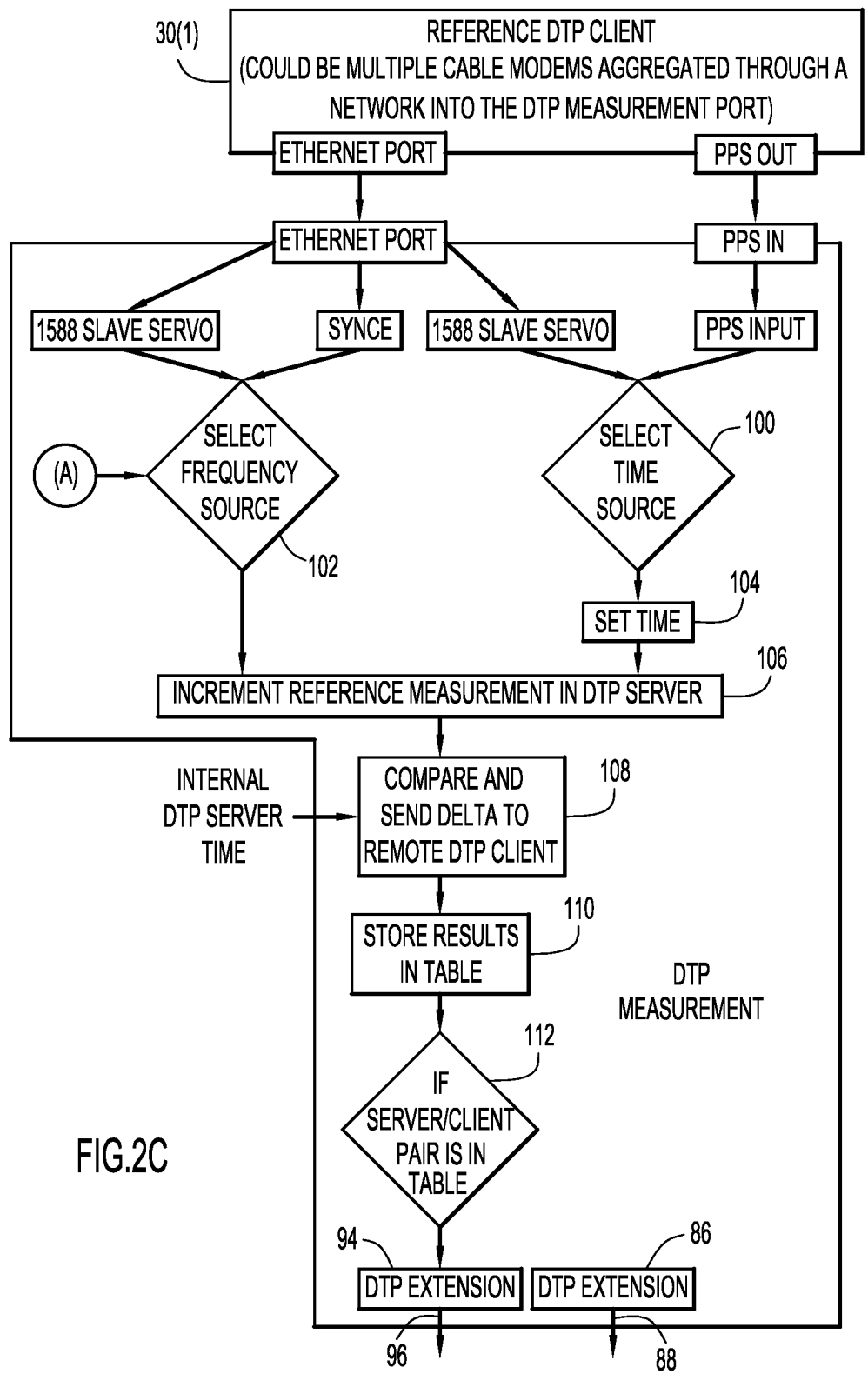
FIG. 2C is a functional block diagram illustrating the details of an example DTP measurement module of a DTP server in accordance with the DTP system of FIG. 1.
Figure 3A:
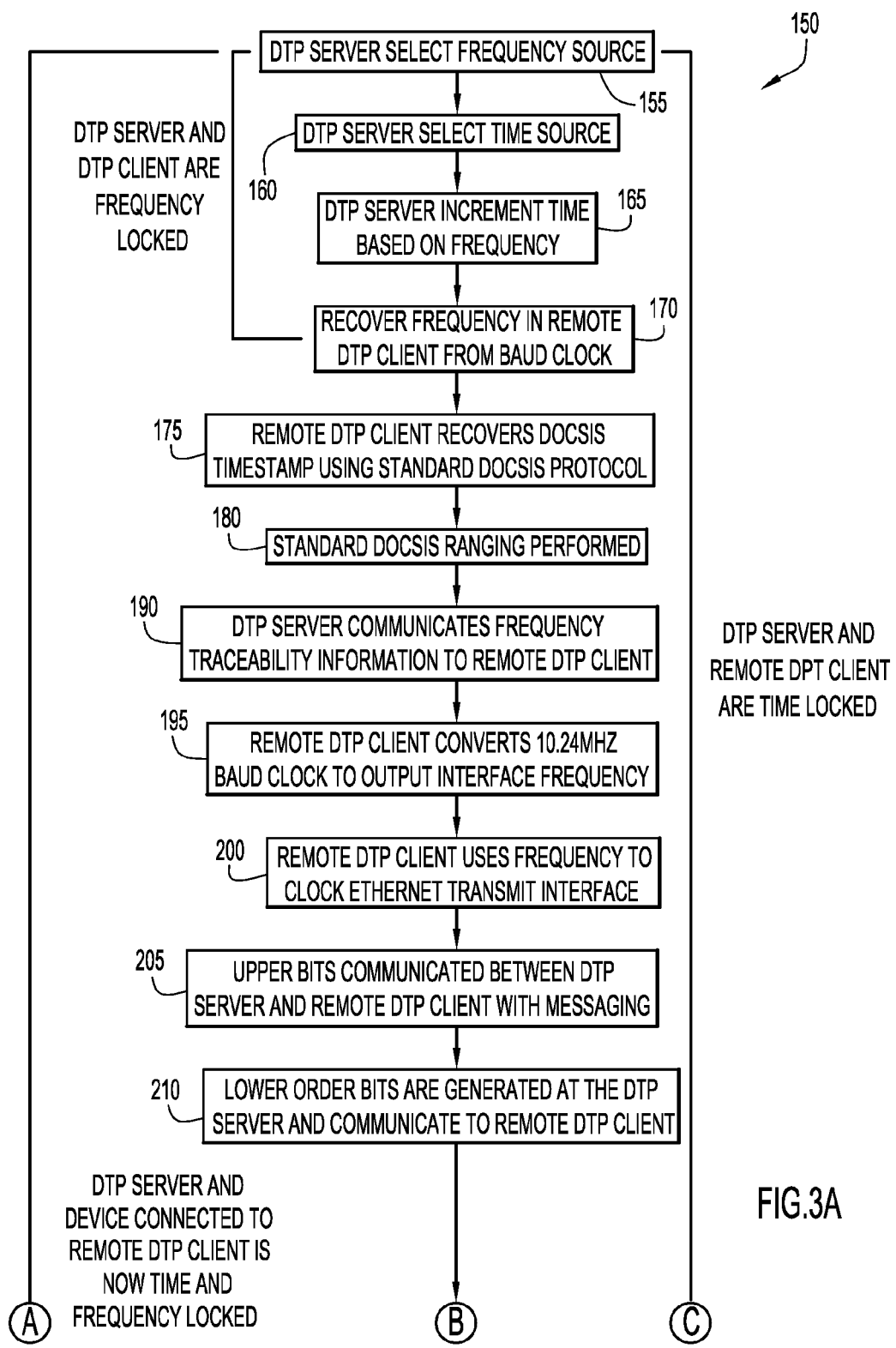
FIGS. 3A-3C depict a flowchart illustrating example operations of a DTP system.
Figure 3B:
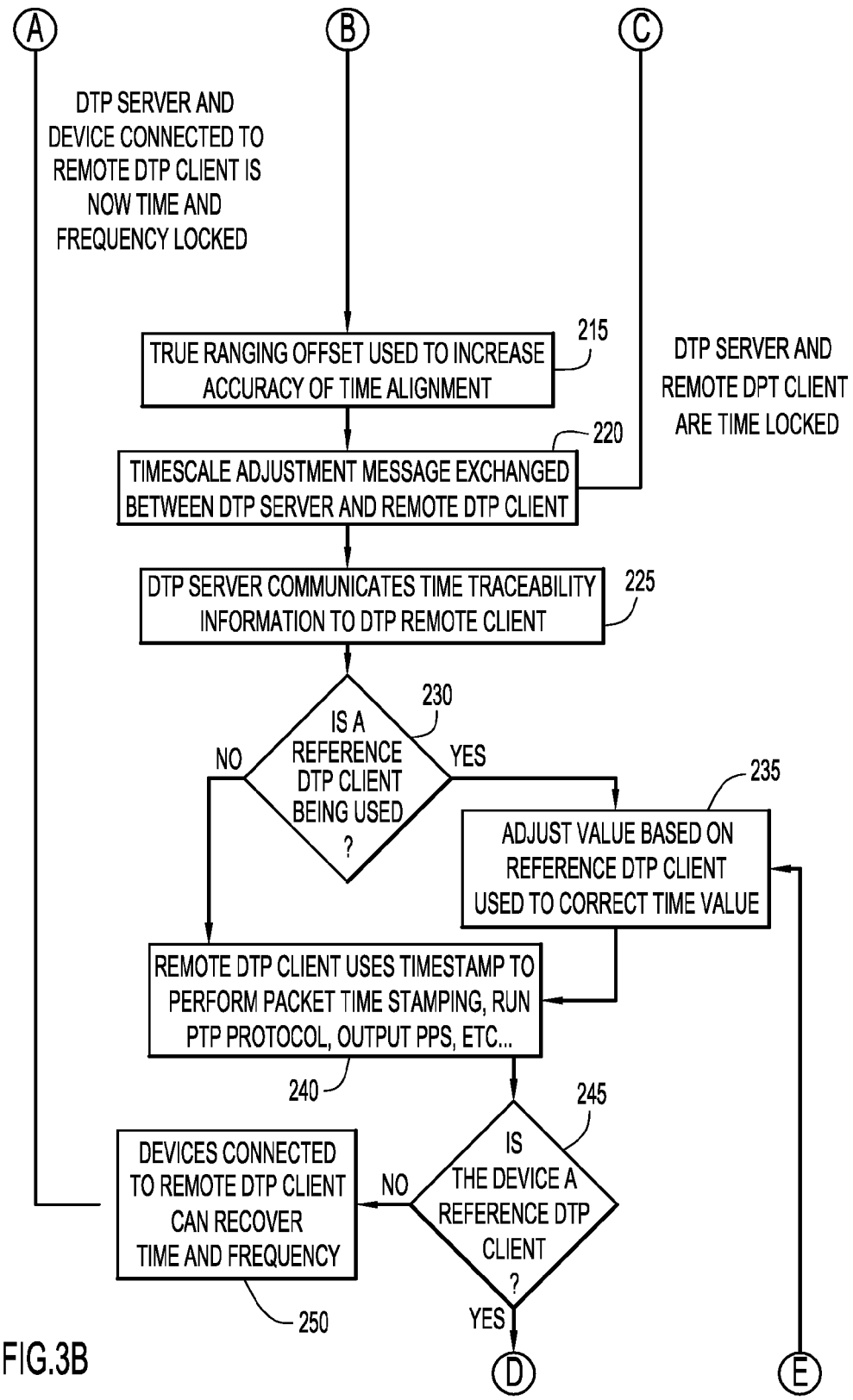
Figure 3C:
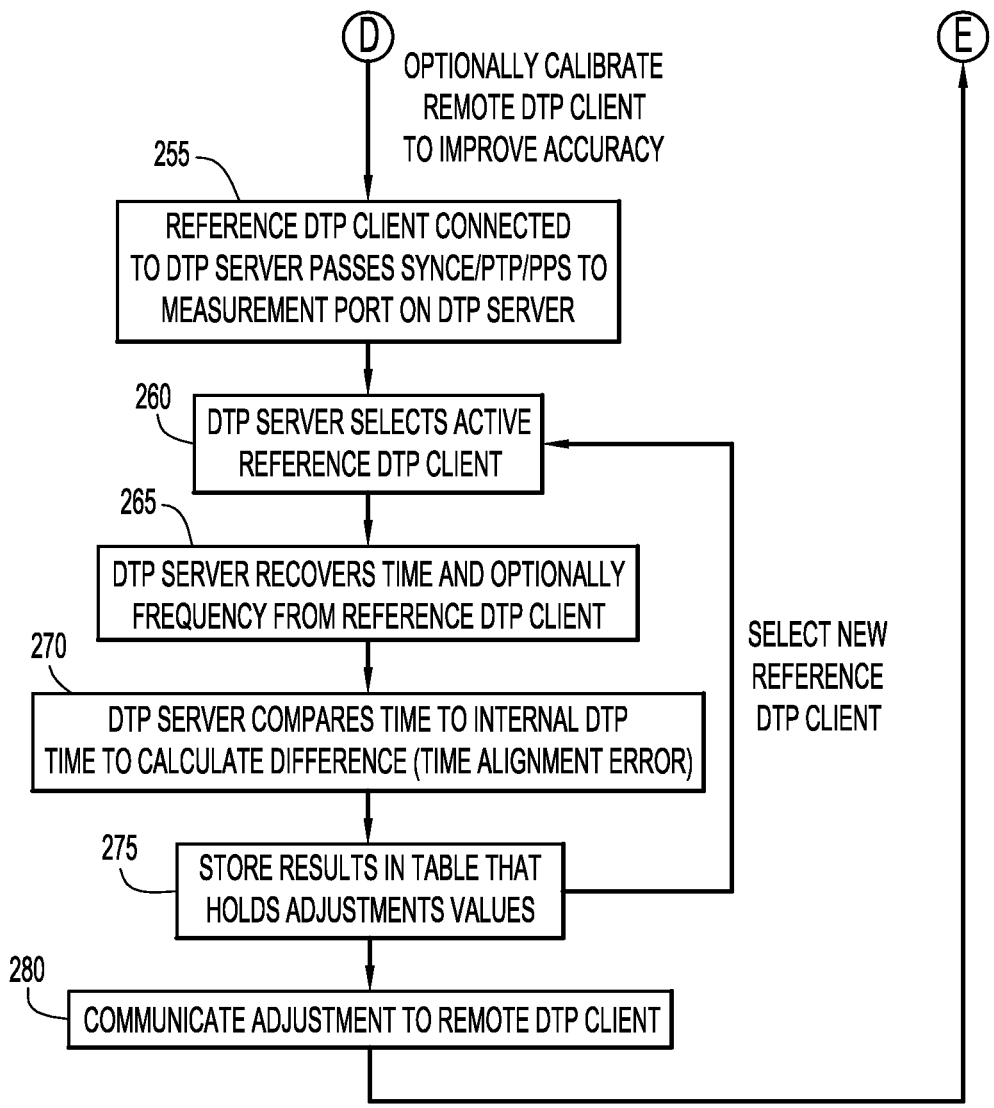

FIG. 2A is a functional block diagram illustrating operations performed by the DTP server 15, while FIG. 2B is a functional block diagram illustrating operations performed by remote DTP client 25(1). Additionally, FIG. 2C is a functional block diagram illustrating operations performed by DTP measurement module 20. FIG. 3 is a flowchart sequentially illustrating the operations of DTP server 15, remote DTP client 25(1), and DTP measurement module 20 executed in accordance with FIGS. 2A-2C. For ease of description, the various functional aspects of DTP server 15 (FIG. 2A), DTP client 25(1) (FIG. 2B), and DTP measurement module 20 (FIG. 2C) in order to generate an accurate non-DOCSIS clock signal at the output of DTP client 25(1) will be described with reference to method 150 illustrated in the flowchart of FIG. 3.

Method 150 of FIG. 3 begins at step 155 where the DTP server 15 selects a frequency source. Block 40 of FIG. 2A illustrates the selection of a frequency source from among, for example, an external DTI server (DOCSIS), internal DTI server (DOCSIS), IEEE 1588 slave servo, SyncE (via an Ethernet port 45), a local reference, a Global Positioning System (GPS) receiver, etc.

At step 160 (FIG. 3) the DTP server 15 selects a time source. Block 44 of FIG. 2A illustrates the selection of a time source from among, for example, an external DTI server (DOCSIS), internal DTI server (DOCSIS), IEEE 1588 slave servo, a local reference, a Global Positioning System (GPS) receiver, etc. The selected time source may be the same or different from the selected frequency source.

Method 150 includes, at step 165, incrementing the DTP server time based on the frequency of the selected frequency source (shown at block 46 of FIG. 2A). Next, at step 170 the selected frequency is recovered in the remote DTP client 25(1) from the baud clock transmitted by the DTP server 15. The baud clock communication is shown using arrow 48 (FIGS. 2A and 2B), and the recovery of the frequency is shown at block 50 of FIG. 2B. After step 170, the DTP server 15 and the DTP client 25(1) are frequency locked.

At step 175 of method 150, the DTP client 25(1) recovers the DOCSIS timestamp using the standard DOCSIS protocol. This standard DOCSIS communication is shown using arrow 52 (FIGS. 2A and 2B), and the recovery of the DOCSIS timestamp is shown at block 54 of FIG. 2B. The recovered DOCSIS timestamp is shown at block 56 of FIG. 2B.

At step 180 of method 150, standard DOCSIS ranging is performed (shown by arrows 58(1) and 58(2) in FIGS. 2A and 2B). This DOCSIS ranging is used, as shown at block 64, to calibrate the received timestamp. The calibrated time stamp (as a result of this ranging refinement) is shown at block 65.

At step 190 the DTP server 15 communicates frequency traceability information to remote DTP client 25(1). The frequency traceability information is communicated as part of the DTP parameters described below, for example, with reference to FIGS. 11A and 11B.

In the examples of FIG. 3, the baud clock is at 10.24 MHz which needs to be modified for use by downstream devices. Therefore, at step 195 the remote DTP client 25(1) converts the 10.24 MHz baud clock to an output frequency. This conversion is shown at block 60 of FIG. 2B. At step 200 of method 150, the remote DTP client 25(1) uses the converted frequency to clock the external transmit interface 62.

Next, at step 205, a first DTP timestamp extension is transmitted from the DTP server 15 to the remote DTP client 25(1) using messaging described further below. This first DTP timestamp extension is a series of higher-order correction bits that are configured to align the DOCSIS timestamp with a protocol time reference point associated with the non-DOCSIS timing protocol (e.g., PTP) that is to be generated at the output of the remote DTP client 25(1). The transmission and receipt of these higher-order bits are shown by block 66 (FIG. 2A), arrow 68 (FIGS. 2A and 2B), and block 70 (FIG. 2B).

At step 210, a second DTP timestamp extension is transmitted from the DTP server 15 to the remote DTP client 25(1) using messaging described further below. This second DTP timestamp extension is a series of lower-order correction bits configured to increase a resolution of the DOCSIS timestamp. The transmission and receipt of these lower-order time bits are shown by arrow 72 (FIGS. 2A and 2B), and block 74 (FIG. 2B). As shown in FIG. 2B, a timestamp is generated at block 76 using the DOCSIS timestamp from block 65 and the upper and lower time bits received from DTP server 15.

As noted, standard DOCSIS ranging is performed by the remote DTP client 25(1). A DTP operation is performed, as described in detail below, to calculate a true ranging offset (TRO) for the DOCSIS system. The calculation of this true ranging offset is represented by block 78 (FIG. 2A), arrows 80(1) and 80(2) (FIGS. 2A and 2B), and block 82 (FIG. 2B). This true ranging offset is used at step 215 of method 150 to increase the accuracy of the time alignment between the DTP server 15 and the remote DTP client 25(1). In other words, the true ranging offset is used to generate a higher accuracy timestamp from the timestamp generated at block 76. This higher accuracy timestamp is generated at block 84.

At step 220, a timescale adjustment message is exchanged between the DTP server 15 and the remote DTP client 25(1). The transmission and receipt of this time scale adjustment message is shown by block 86 (FIG. 2C), arrow 88 (FIGS. 2B and 2C), and block 90 (FIG. 2B). The timescale adjustment is used along with the timestamp previously generated at block 84 to generate a globally relevant high accuracy time stamp at block 92. At step 225 the DTP server 15 communicates time traceability information to remote DTP client 25(1) as part of the DTP parameters described below, for example, with reference to FIGS. 11A and 11B.

At step 230, a determination is made as to whether a reference DTP client 30(1) is present and in use within DOCSIS system 10. If a reference DTP client 30(1) is in use, method 150 proceeds to step 235 where the reference DTP client provides a time reference to the DTP measurement port. The DTP measurement function then passes the measurement to the DTP server that maintains a table and can update the remote DTP clients with a message that is used to adjust the generated timestamp at the DTP client 25(1). The transmission and receipt of this message is shown by block 94 (FIG. 2C), arrow 96 (FIGS. 2B and 2C), and block 98 (FIG. 2B). The message is used to generate another timestamp based on the timestamp generated at block 84, thereby providing a higher accuracy timestamp to block 92. Method 150 then proceeds to step 240.

If it is determined at step 230 that no reference DTP client is in use, the method 150 also proceeds to step 240. At step 240, the remote DTP client 25(1) uses the final timestamp (generated at block 92 in FIG. 2B) to perform packet time stamping, run PTP protocol, output PPS, etc.

At step 245 of method 150, a determination is made as to whether the DTP client that has received the various above described communications is a reference DTP client. If the DTP client is not a reference DTP client (i.e., it is a remote DTP client), method 150 proceeds to step 250 where downstream devices (e.g., macrocells, routers, etc.) connected to the DTP client can accurately recover time and frequency in accordance with the non-DOCSIS timing protocol (e.g., PTP).

Returning to step 245, if the DTP client is a reference DTP client, method 150 proceeds to step 255 where the reference DTP client 30(1) (connected to the DTP server 15) may pass SyncE, PTP, PPS, etc. to a measurement port on the DTP server 15. At step 260, the DTP server 15 selects an active reference DTP client. At step 265, the DTP server 15 recovers time (block 100 in FIG. 2C) and optionally frequency (block 102 in FIG. 2C) from the reference DTP client 30(1). As shown in FIG. 2C, the time is set at block 104 and an increment of the reference in the DTP server 15 is performed at block 106.

Returning to method 150, at step 270 the DTP server 15 compares the time to an internal DTP time to calculate a difference, which is the time alignment error. This comparison is performed at block 108 of FIG. 2C. At step 275 of method 150, the difference (i.e., time alignment error) is stored in a table that holds adjustment values. This storage operation is performed at block 110 of FIG. 2C. If multiple DTP clients are in use, after step 275 a new DTP client is selected and steps 260-275 are repeated. Finally, if it is determined at 112 (FIG. 2C) that the server/client pair is in the table, at step 280 an adjustment value is communicated to the DTP client for use, as described above, at step 235.

Figure 4:
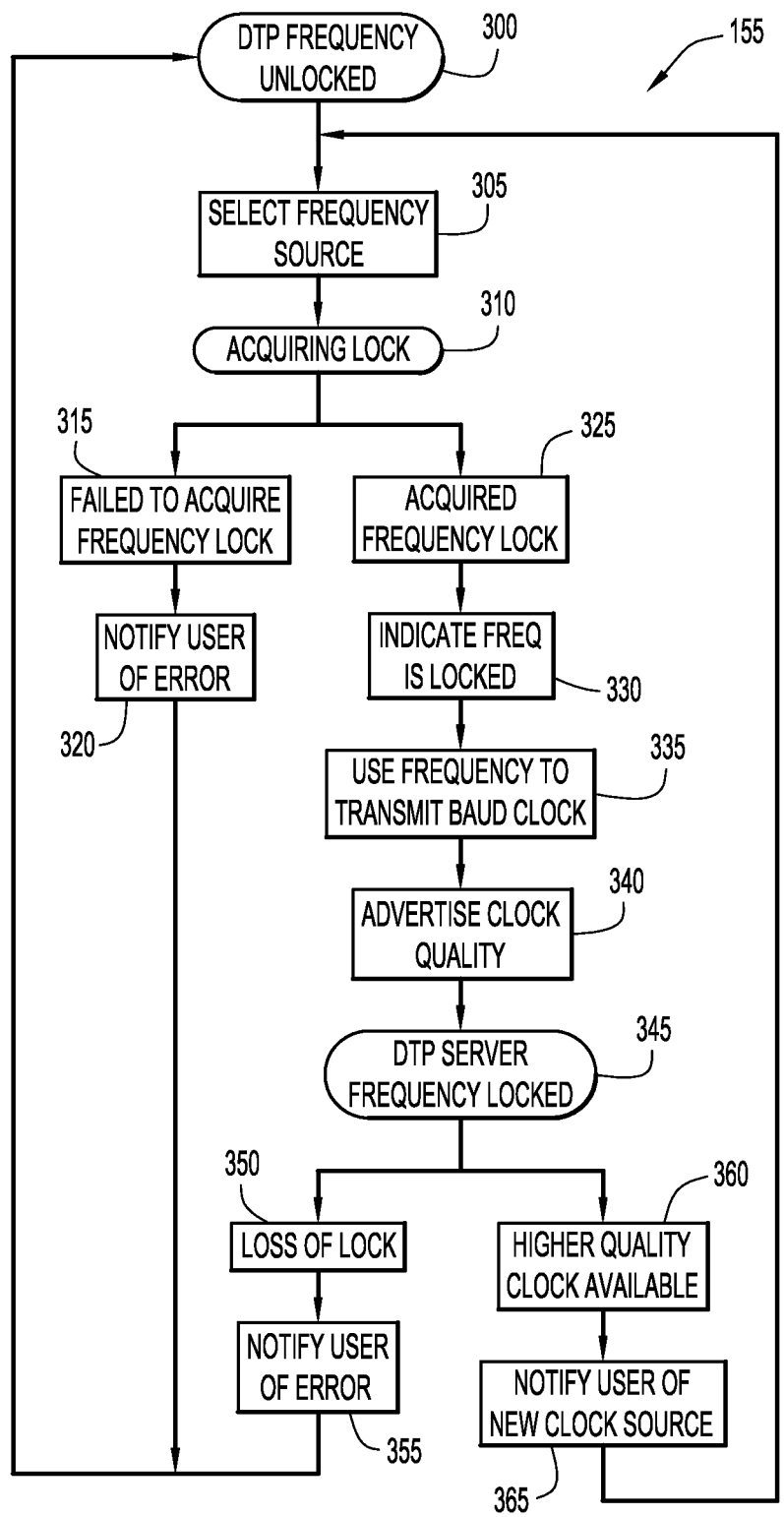
FIG. 4 is a flowchart illustrating operations for selection of a frequency source at a DTP server.

FIG. 4 is a flowchart illustrating one example frequency selection method executed at step 155 of FIG. 3. For ease of reference, this method will be referred to as method 155.

The frequency selection method 155 begins at 300 where the DTP server 15 is in a frequency unlocked state. A frequency source is then selected at 305. As noted above, the frequency source may comprise, for example, an external DTI server (DOCSIS), internal DTI server (DOCSIS), IEEE 1588 slave servo, SyncE, a local reference, a GPS receiver, etc.

At 310, the DTP server 15 enters a state in which the server attempts to acquire frequency lock with the source. If the DTP server 15 fails to acquire frequency lock, the method 155 proceeds to 315 and then to 320 where a user is notified of the frequency lock error. Method 155 may then end or return to 300 for selection of a different frequency source.

If the DTP server 15 is able to acquire frequency lock (at 310), the method 155 proceeds to 325 and then 330 where an indication of frequency lock is generated. At 355, the locked frequency is used to transmit the downstream baud clock. At 340, the quality of the clock is advertised and at 345 the DTP server 15 enters a frequency locked state.

If loss of lock subsequently occurs at 350, the method 155 proceeds to 355 where a user is notified of the error. Method 155 may then end or return to 300 for selection of a different frequency source. If a higher quality clock subsequently becomes available at 360, the user is notified of the new source at 365 and the method 155 can return to 305 for selection of the new higher quality source.

Figure 5:
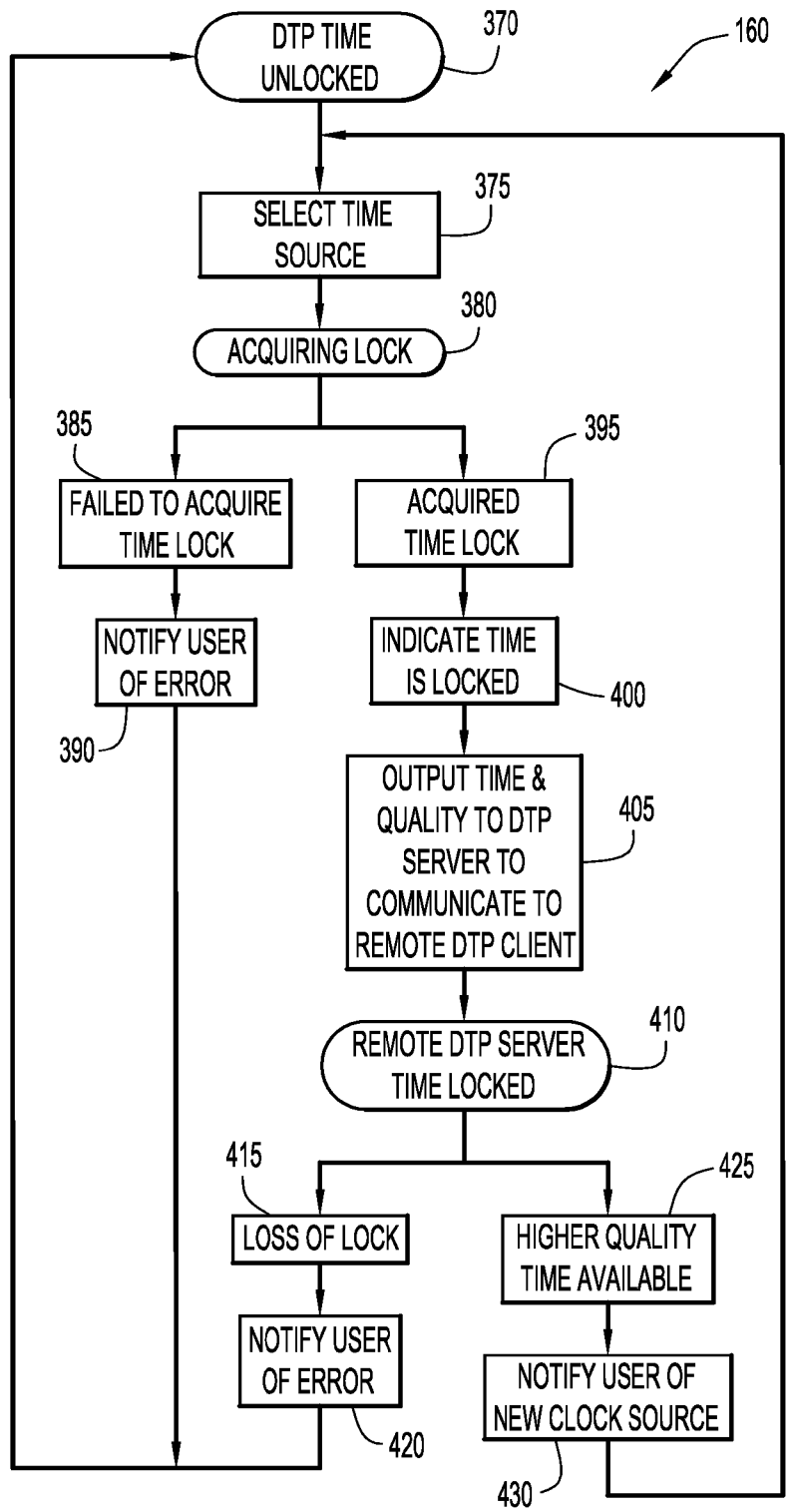
FIG. 5 is a flowchart illustrating operations for selection of a time source at a DTP server.

FIG. 5 is a flowchart illustrating one example time source selection method executed at step 160 of FIG. 3. For ease of reference, this method will be referred to as method 160.

The time source selection method 160 begins at 370 where the DTP server 15 enters a DTP time unlocked state. A time source is then selected at 375. As noted above, the time source may comprise, for example, an external DTI server (DOCSIS), internal DTI server (DOCSIS), IEEE 1588 slave servo, a local reference, a GPS receiver, etc.

At 380, the DTP server 15 enters a state in which the server attempts to acquire time lock with the source. If the DTP server 15 fails to acquire time lock, the method 160 proceeds to 385 and then to 390 where a user is notified of the time lock error. Method 160 may then end or return to 370 for selection of a different time source.

If the DTP server 15 is able to acquire time lock (at 380), the method 160 proceeds to 395 and then 400 where an indication of time lock is generated. At 405, the time and quality of the time is communicated to the remote DTP client 25(1). At 410, the DTP server 15 enters a time locked state (i.e., the DTP server 15 is determined to be time locked).

If loss of lock subsequently occurs at 415, the method 160 proceeds to 420 where a user is notified of the error. Method 160 may then end or return to 370 for selection of a different time source. If a higher quality clock subsequently becomes available at 425, the user is notified of the new source at 420 and the method 160 can return to 375 for selection of the new higher quality source.

Figure 6:
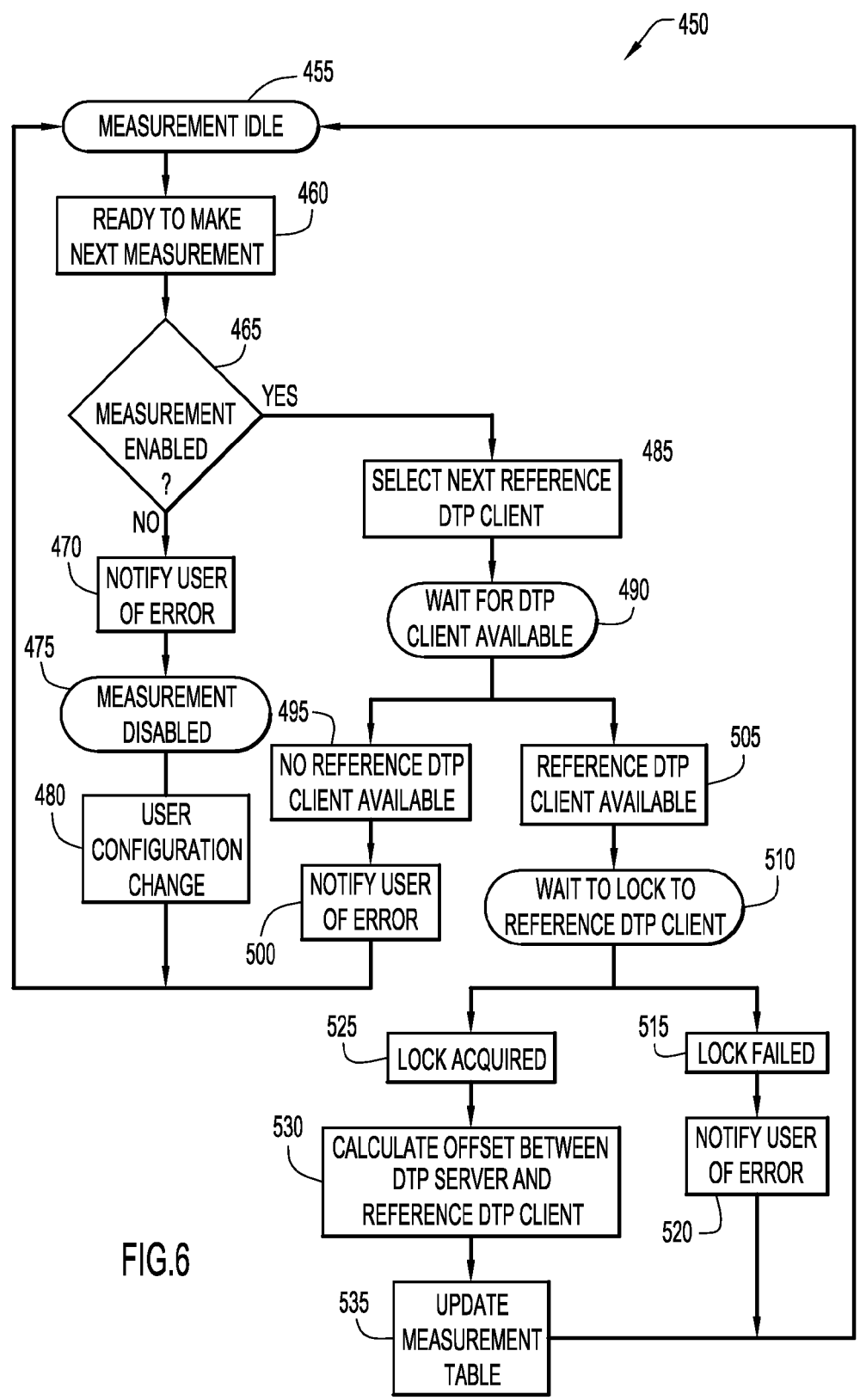
FIG. 6 is a flowchart illustrating operations of a DTP measurement module.

As noted above with reference to FIG. 3, method 150 includes several operations in which time measurements between a DTP server time and the time of a reference DTP client 30(1) are compared (e.g., steps 260-275 of FIG. 3). FIG. 6 is a flowchart illustrating further details of these operations, collectively referred to herein as method 450.

Method 450 begins at 455 where the measurement process is in an idle state. At 460, the process is ready to make the next measurement and, at 465, a check is performed to ensure that the measurement function is enabled. If the measurement function is not enabled, method 450 proceeds to 470 where a user is notified of the error. Subsequently, the method 450 proceeds to 475 into a state where the measurement function is disabled. At 480, a user configuration change may be performed and the method may then end or return to 455.

If the measurement is enabled at 465, method 450 proceeds to 485 where the next reference DTP client is selected. The system enters a waiting state at 490 until the next reference DTP client is available. If no reference DTP client is available, the method 450 proceeds to 495 and then to 500 where a user is notified of the error. The method may then end or return to 455.

If a reference DTP does become available (at 490), method 450 proceeds to 505 and then to 510 where the system enters a state in which it waits to lock to the reference DTP client. If the lock fails, the method 450 proceeds to 515 and then to 520 where a user is notified of the error. The method may then end or return to 455. If lock is acquired (at 510), the method 450 proceeds to 525 and then 530. At 530, the offset between the DTP server time and the reference DTP client time is calculated. This calculation is the time alignment error with respect to the DTP client. At 535, a measurement table is updated with the calculated value. The method may then end or return to 455.

Figure 7:
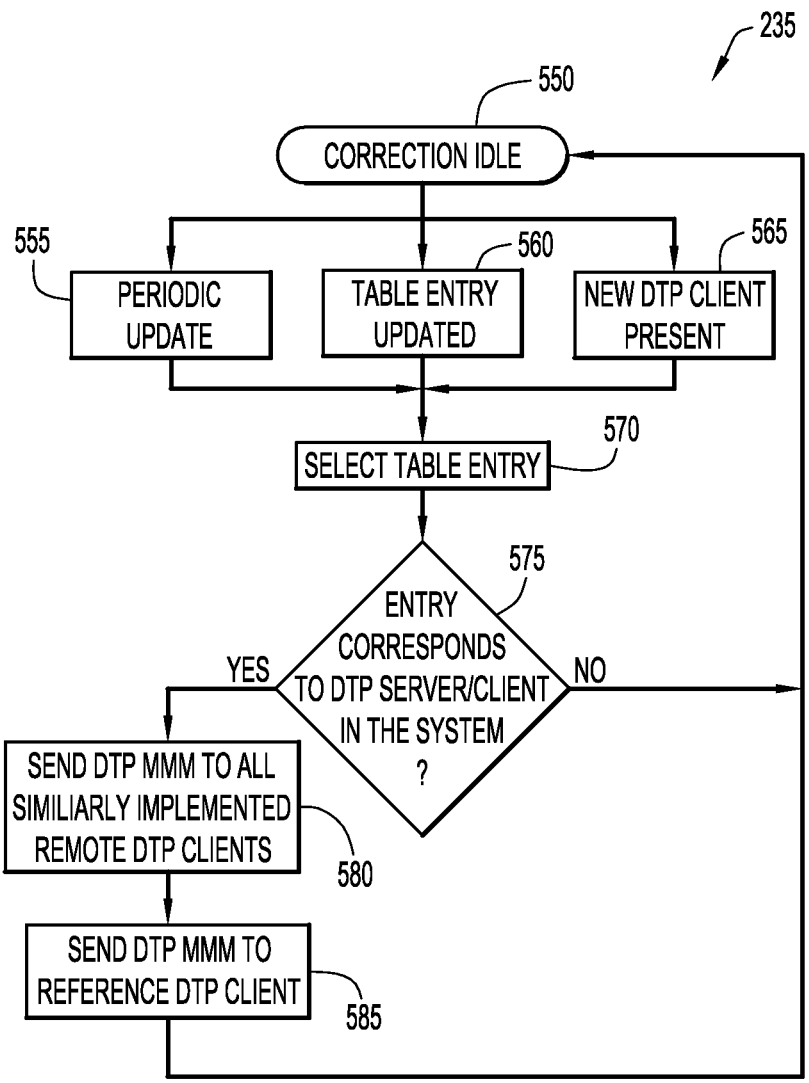
FIG. 7 is a flowchart illustrating time correction operations of a DTP server

As noted above with reference to FIG. 3, when a reference DTP client 30 is in use, method 150 includes the step 235 where a correction message is received from the reference DTP client 30(1) and this correction message is used to generate a timestamp at the DTP client 25(1). In the above examples, the correction message is used to correct the timestamp generated at block 84 (FIG. 2B) (i.e., generate a new timestamp based on the previously generated timestamp) and thus provides a higher accuracy timestamp to block 92 (FIG. 2B). FIG. 7 is a flowchart illustrating further details of the operations at step 235 of FIG. 3. For ease of reference, this method will be referred to as method 235. In one example, method 235 operates using the table entries generated as described above with reference to FIG. 6.

Method 235 begins at 550 where the correction mechanism is in an idle state. The method 235 may then proceed to one of three operations at 555, 560, and 565. At 555, a periodic update may be performed (i.e., a periodic update timer is fired to start the update process), at 560 a table entry is updated, and at 565 a new DTP client is present. From each of these three operations, method 235 proceeds to 570 where a table entry is selected. At 575, a determination is made as to whether the selected entry corresponds to the DTP server 15 and a remote DTP client 25(1) in the system. If not, method 235 returns to 550.

If the selected entry corresponds to the DTP server 15 and a remote DTP client 25(1) in the system, method 235 proceeds to 580 where a DTP MAC Management Message (MMM) is sent to all similarly implemented remote DTP clients (e.g., remote clients having similar chipsets, internal timing characteristics, etc.). At 585, the DTP MMM is sent to the reference DTP client 30(1) and method 235 returns to 550. Details of the MAC Management Message are provided below.

Figure 8:
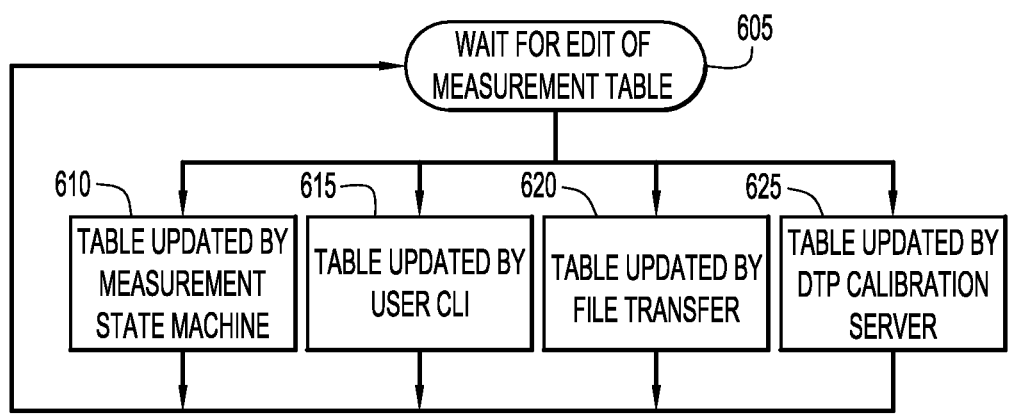
FIG. 8 is flowchart illustrating operations for updating a measurement table at a DTP measurement module.

FIG. 8 is a flowchart illustrating a method 600 for updating the measurement table. Method 600 starts at 605 where the system is in a state in which it waits for execution of the process for editing of the measurement table. After the editing process is invoked, the method 600 may proceed to any of 610, 615, 620 or 625. At 610, the table is updated by measurement at the state machine. At 615, the table is updated by a user through a command line interface (CLI). At 620, the table is updated via a file transfer, while at 625 the table is updated by a DTP calibration function of the DTP server 15.

Figure 9:
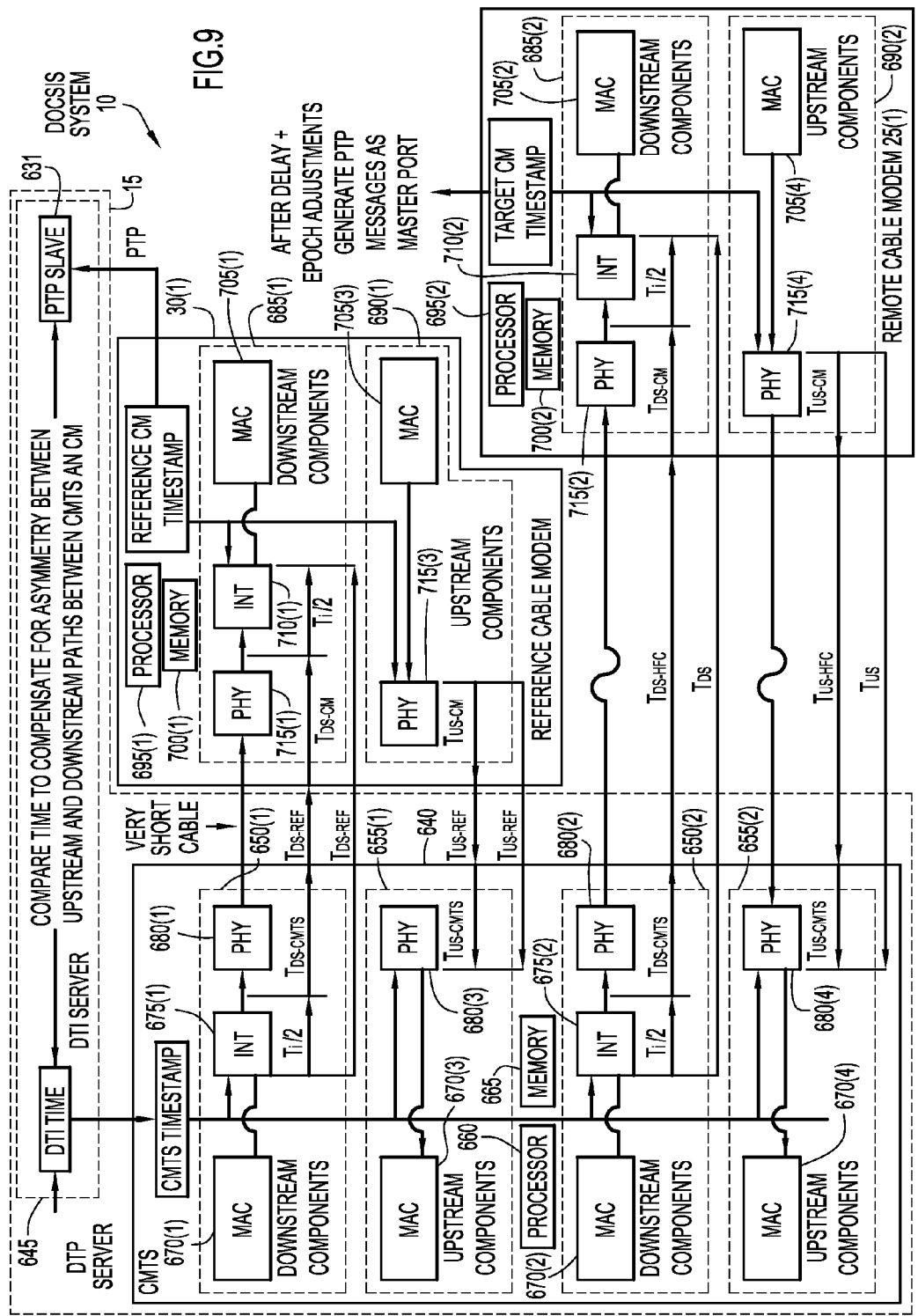
FIG. 9 is a schematic block diagram illustrating further details of the DTP system of FIG. 1.

FIG. 9 is a block diagram illustrating example architecture for DOCSIS system 10. In this example, DTP server 15 comprises a CMTS 640 operating with an external DTI server 645. Remote DTP client 25(1) and reference DTP client 30(1) each comprise a cable modem, referred to in the description of FIG. 9 as remote cable modem 25(1) and reference cable modem 30(1). DTP server 15 is located at the head end of the DOCSIS system 10 and may comprise any number of different combinations of additional elements configured to provide high speed data services, such as cable Internet or voice over Internet Protocol (VoIP), to downstream devices via the remote cable modem 25(1). For ease of illustration, several conventional components of a CMTS 640, such as network interfaces, RF interfaces, etc., have been omitted from FIG. 9. However, as shown, CMTS 640 does comprise first and second sets of downstream components 650(1) and 655(2), respectively, first and second sets of upstream components 655(1) and 655(2), respectively, a processor 660, and a memory 665.

Downstream components 650(1) and 650(2) are configured to transmit signals to reference cable modem 30(1) and remote cable modem 25(1), respectively, via coaxial or hybrid fiber/coaxial (HFC) cables. Downstream components 650(1) and 650(2) each comprise, among other elements that have been omitted for ease of illustration, a Media Access Controller (MAC) 670(1) and 670(2), respectively, an interleaver 675(1) and 675(2), respectively, and a physical layer interface (PHY) 680(1) and 680(2), respectively.

Upstream components 655(1) and 655(2) are configured to receive signals from reference cable modem 30(1) and remote cable modem 25(1), respectively, via the coaxial or HFC cable. Upstream components 655(1) and 655(2) each comprise, among other elements that have been omitted for ease of illustration, a MAC 670(3) and 670(4), respectively and a PHY 680(3) and 680(4), respectively. MACs 670(1)-670(4) each comprise hardware, software, or a combination thereof.

In the example of FIG. 9, reference cable modem 30(1) and remote cable modem 25(1) are substantially the same (i.e., have substantially similar implementations), except that they are physically located at different areas in the network. More specifically, reference cable modem 30(1) is located with CMTS 640 at the system head end and is connected to the CMTS 640 via a short cable (coaxial or HFC). Remote cable modem 25(1) is located at the customer premises (i.e., remote from the CMTS 640) and is connected to the CMTS 640 via a long cable (coaxial or HFC). Remote cable modem 25(1) is configured to provide precision timing to an external entity.

As shown, reference cable modem 30(1) and remote cable modem 25(1) each comprise downstream components 685(1) and 685(2), respectively, upstream components 690(1) and 690(2), respectively, a processor 695(1) and 695(2), respectively, and a memory 700(1) and 700(2), respectively. For ease of illustration, several conventional components of a cable modem, such as RF interfaces, etc., have been omitted from FIG. 9.

Downstream components 685(1) and 685(2) are configured to receive signals from CMTS 640. Downstream components 685(1) and 685(2) each comprise, among other elements that have been omitted for ease of illustration, a Media Access Controller (MAC) 705(1) and 705(2), respectively, an interleaver 710(1) and 710(2), respectively, and a physical layer interface (PHY) 715(1) and 715(2), respectively.

Upstream components 690(1) and 690(2) are configured to transmit signals to CMTS 640. Upstream components 690(1) and 690(2) each comprise, among other elements that have been omitted for ease of illustration, a MAC 705(3) and 705(4), respectively and a PHY 715(3) and 715(4), respectively. MACs 705(1)-7050(4) each comprise hardware, software, or a combination thereof.

In the example of FIG. 9, the DTI server 645 serves as the source of a clock. DTI server 645 may also provide measurement functions using a PTP slave port 631. The additional functionality defined by DTP for the DTI server 645 may also be native to the CMTS 640.

FIG. 9 also shows the various system delays for the DOCSIS system 10. These various are defined in Table 1, below.

TABLE 1

DOCSIS System Delay Definitions

| Variable | Description |
| --- | --- |
| Tds | Total downstream delay from CMTS timestamp reference point to the cable modem timestamp reference point. This is the ultimate value that needs to be determined. |
| Tus | Total upstream delay from the cable modem timestamp reference point to the CMTS timestamp reference point. |
| Trtt | Trtt = Tds + Tus. This is a measured value. |
| Ti | Total interleaver delay in the downstream path. The delay is equally shared between the CMTS and cable modem implementation. |
| Tds-cmts | Delay from CMTS timestamp reference point to CMTS output. This does not include the interleaver delay. |
| Tds-hfc | Delay of the HFC plant in the downstream. |
| Tds-cm | Delay from the input port of the cable modem to the cable modem timestamp reference point. This does not include the interleaver delay. |
| Tus-cm | Delay from the cable modem timestamp reference point to the cable modem output. |
| Tus-hfc | Delay of the HFC plant in the upstream. |
| Tus-cmts | Delay from the CMTS input port to the CMTS timestamp reference point. This delay should take into account the difference from where the cable modem timestamp was inserted into the upstream packet and the reference point used by the CMTS timestamp that the CMTS US PHY attaches to the packet. |
| A | An assigned variable that expresses the upstream to downstream asymmetry. This does not include the downstream interleaver delay or the upstream queuing delay or scheduler uncertainty. Asymmetry may come from differences in propagation delay at different frequencies and if there are any differences in path length between the downstream and upstream paths. |
| HFC correction factor | A value to allow a manual configuration that compensates for HFC plant asymmetry |
| HFC plant asymmetry | This is the asymmetry which might exist within the HFC plant |

As noted above, DTP specifies that the remote DTP client 25(1) (e.g., cable modem) will frequency synchronize with the DTP server 15 (e.g., CMTS with or without DTI server) on the DOCSIS network. In practice, the Synchronous Ethernet port of the remote DTP client 25(1) is synchronized to the baud clock of the downstream quadrature amplitude modulation (QAM) signal. Since the jitter of the downstream DOCSIS baud clock generally exceeds the jitter requirements for Ethernet, a phase lock loop (PLL) with M/N frequency correction and jitter filtering is used.

Prior to DOCSIS 3.0, a cable modem in advanced time division multiple access (ATDMA) mode did not lock to the downstream baud clock. In TDMA or ATDMA, the cable modem timing was derived entirely from the DOCSIS timestamp. In synchronous code division multiple access (SCDMA), the cable modem locks to the downstream baud clock. In DOCSIS 3.0, the CMTS publishes a bit in the MAC Domain Description (MDD) message called the symbol clock locking indicator. If this bit is set, then the cable modem locks to the downstream baud rate clock. For Synchronous Ethernet, the CMTS sets this bit and the cable modem locks to the downstream baud clock for any upstream multiple access type in use, including TDMA, ATDMA, and SCDMA.

The base frequency of a gigabit Ethernet port is approximately 125 MHz. The base frequency of a 100BaseT port is 25 MHz. The base frequency of the DOCSIS QAM signal is 10.24 MHz. The mathematical relationships between these clocks are:

$$10.24 \text{ MHz} * 3125/256 = 125 \text{ MHz}$$

$$10.24 \text{ MHz} * 625/256 = 25 \text{ MHz}$$

This is executed by a fractional M/N PLL on the cable modem.

Generally, time synchronization in DTP refers to the generation of a timestamp at the Ethernet interface of the remote DTP client 25(1) that is compatible with the applicable non-DOCSIS timing protocol (e.g., PTP, NTP, etc.) and that is synchronous and phase aligned with the DTP timing source. The DTP timing source is then offset from a defined epoch. As is well known, an epoch is the origin point in time of a time scale.

The DOCSIS timestamp in a stand-alone CMTS has an arbitrary value. If the CMTS is connected to, or has integrated therein, a DTI Server, and the DTI Server is connected to a GPS, then the DTI server can align the DOCSIS timestamp with the GPS Epoch (i.e., Jan. 6, 1980 at 0 h). PTP references time as the number of nanoseconds after the epoch of the beginning of the day of Jan. 1, 1972. Alternatively, PTP can have arbitrary epochs.

In practice, the DTP approach is to first compensate for the time offset between the DOCSIS timestamp at the remote DTP client 25(1) and the DOCSIS timestamp at the DTP server 15. Then, the DOCSIS timestamp at the remote DTP client 25(1) is used to generate a corrected downstream non-DOCSIS timestamp (e.g., a PTP timestamp).

There are three general operations performed at the remote DTP client 25(1). First, the lower significant bits of the corrected downstream timestamp are derived from the lower DTP timestamp extension (lower-order DTP) received from the DTP server 15. Second, the upper significant bits of the corrected downstream timestamp are derived from the upper DTP timestamp extension (high-order) time bits received from the DTP server 15. Third, the offset that represents the delay from the DTP server 15 to the remote DTP client 25(1)

is measured, calculated, signaled and then applied to the corrected downstream timestamp.

Due to the limited size of the DOCSIS timestamp, it rolls over to zero approximately every 7 minutes. This means that the upper bits of the PTP timestamp (i.e., higher order DTP timestamp extension) should be sent more frequently than 7 minutes and that the cable modem mechanism handles the rollover when attaching the upper bits.

There are various ways of constructing signaling in accordance with DTP. In one method, the various system offsets are measured and collected by the DTP server 15. The DTP server 15 then sends a final correction value to the remote DTP client 25(1). In another method, the DTP server 15 may publish any determined offsets and the remote DTP client 25(1) measures internal offsets and performs the final calculation. The derivation of the offset is described below.

The round trip DOCSIS path delay is inherently asymmetrical and can contain a moderate to high amount of jitter. Asymmetry and jitter introduce error into any non-DOCSIS timing protocol that might traverse the DOCSIS network. DTP mitigates these two factors by modifying the DOCSIS hardware design and deriving timing information directly from the DOCSIS system at the cable for use by a timing protocol (e.g., NTP/PTP).

The packet transport delay in the downstream path of DOCSIS is relatively stable. It has a variety of fixed delays in the equipment and some variable propagation delay on the plant depending upon, for example, wind and temperature. The downstream interleaver delay is a programmable value and for DOCSIS is typically 0.68 ms (for 256-QAM). The length of the DOCSIS plant can be from zero to 100 miles. As a result, the one-way transit delay of the HFC plant can be up to 800 µsec. The PHY delays are unknown, and the actual time that a bit passes through the external RF interface is indeterminate. Transit time will also depend upon other configuration parameters such as modulation order and FEC type.

The upstream DOCSIS path has much more uncertainty. To send a packet upstream, a cable modem launches a request packet in a contention slot. If that message fails, the cable modem keeps trying at longer and longer time intervals until it gets through. The CMTS then schedules a data transmission slot and issues a MAP MAC Management message. MAP messages tell cable modems when to start and stop upstream transmissions, and what modulation profile to use. Although this mechanism is efficient, it is also unpredictable. This is one reason why timing protocols that are run over the top layer may see large variation in their results.

There are other scheduling techniques in DOCSIS, such as unsolicited grant service (UGS) or real time polling (RTP) services that can make the transmission opportunities more predictable. However, due to the natural jitter (on the order of 1 ms) in CMTS scheduling resolution, these alternative scheduling techniques generally do not provide enough accuracy for precision timing.

DTP relies on the DOCSIS system to take a series of measurements and then uses these measurements to apply the appropriate correction factor to the DOCSIS timestamp to generate the non-DOCSIS timing signal. Because, as detailed below, this process relies partly on the DOCSIS ranging mechanism, a brief description of DOCSIS ranging is provided below. For ease of illustration, the following example refers specifically DOCSIS ranging between a cable modem and a CMTS.

In a DOCSIS system, a cable modem receives a CMTS timestamp and then uses it directly as the cable modem timestamp. Thus, the cable modem timestamp is delayed with respect to the CMTS timestamp by a downstream delay caused by elements of the CMTS, the HFC plant, and elements of the cable modem. Therefore, if the cable modem uses this timestamp to transmit an upstream packet, then that packet would arrive late at the CMTS. In fact, it would arrive late by an amount approximately equal to the entire downstream delay and the entire upstream delay.

DOCSIS systems have a two-part process to address this timestamp difference between the CMTS and the cable modem. The first part of this process is known as initial ranging in which the CMTS sets up a large (usually 2 ms) upstream Initial Ranging window. This window is contention based and any unregistered cable modem can attempt to register. The cable modem sends a ranging request packet. The CMTS measures the arrival time error and sends back the error in a ranging response message. This continues until the system is working with specification limits. The second part of the timestamp difference compensation process includes repeating the above ranging process at regular intervals (e.g., 30 seconds or less). This periodic maintenance is unicast in nature since the address of the cable modem is now known.

The net result of the above is that the cable modem calculates a ranging offset. The cable modem then subtracts this ranging offset from its timestamp to determine when it actually needs to transmit a packet.

In the above operations, the CMTS is not formally informed of the calculated length of the ranging offset. Also, the ranging offset held in the internal cable modem register can be unique to each implementation. Furthermore, there are many delay elements in the cable modem upstream design and the ranging offset is only one example.

In summary, when the cable modem is instructed to transmit a packet to the CMTS at a particular time, it sends it at an earlier point in time (because the CMTS is ahead of the cable modem). To determine how much earlier the packet needs to be sent, the cable modem goes through a ranging process with the CMTS to determine a ranging offset. The cable modem uses this ranging offset to transmit a packet earlier than the timestamp indicated in the DOCSIS MAP message. If ranging was done correctly, then the packet will arrive at the CMTS in the correct timeslot indicated in the MAP.

The first DTP system measurement used for timestamp correction is a round trip delay between the DTP server 15 and the remote DTP client 25(1) (i.e., the time it takes a packet to travel from the CMTS to the cable modem and back to the CMTS), referred to herein as the DOCSIS round trip delay. One mechanism described herein to calculate the DOCSIS round trip delay leverages the ranging process.

More specifically, the actual ranging offset used in a DOCSIS system is dependent, in part, in the specific implementation of the cable modem. As such, in accordance with the DTP, a measurement known as the true ranging offset (TRO) is performed and used for the above noted timestamp correction. This true ranging offset measurement is taken between the two reference points that matter to the DTP, namely the DTP server timestamp (e.g., the CMTS timestamp (as referenced in the MAP message)) and the DTP client timestamp (e.g., the cable modem timestamp). The true ranging offset of the remote DTP client 25(1) in accordance with the DTP is defined as the difference between the time the first bit of a packet is transmitted in the upstream from the remote DTP client 25(1) (in terms of the DTP client timestamp) and the time the first bit of the packet is expected to arrive at the DTP server 15 (in terms of the DTP server timestamp). The expected packet arrival time at the DTP server 15 is listed in the MAP message. Therefore, the remote DTP client 25(1) includes memory that is configured to store this value. The remote DTP client 25(1) also includes hardware and/or software components that capture (record and store) the reference DTP client timestamp value when the correct packet transmits. The DTP client hardware and/or software then will subtract these two values to obtain the true ranging offset. The total round trip delay between the DTP server 15 and the remote DTP client 25(1) is equal to the true ranging offset of the remote DTP client 25(1).

Figure 10:
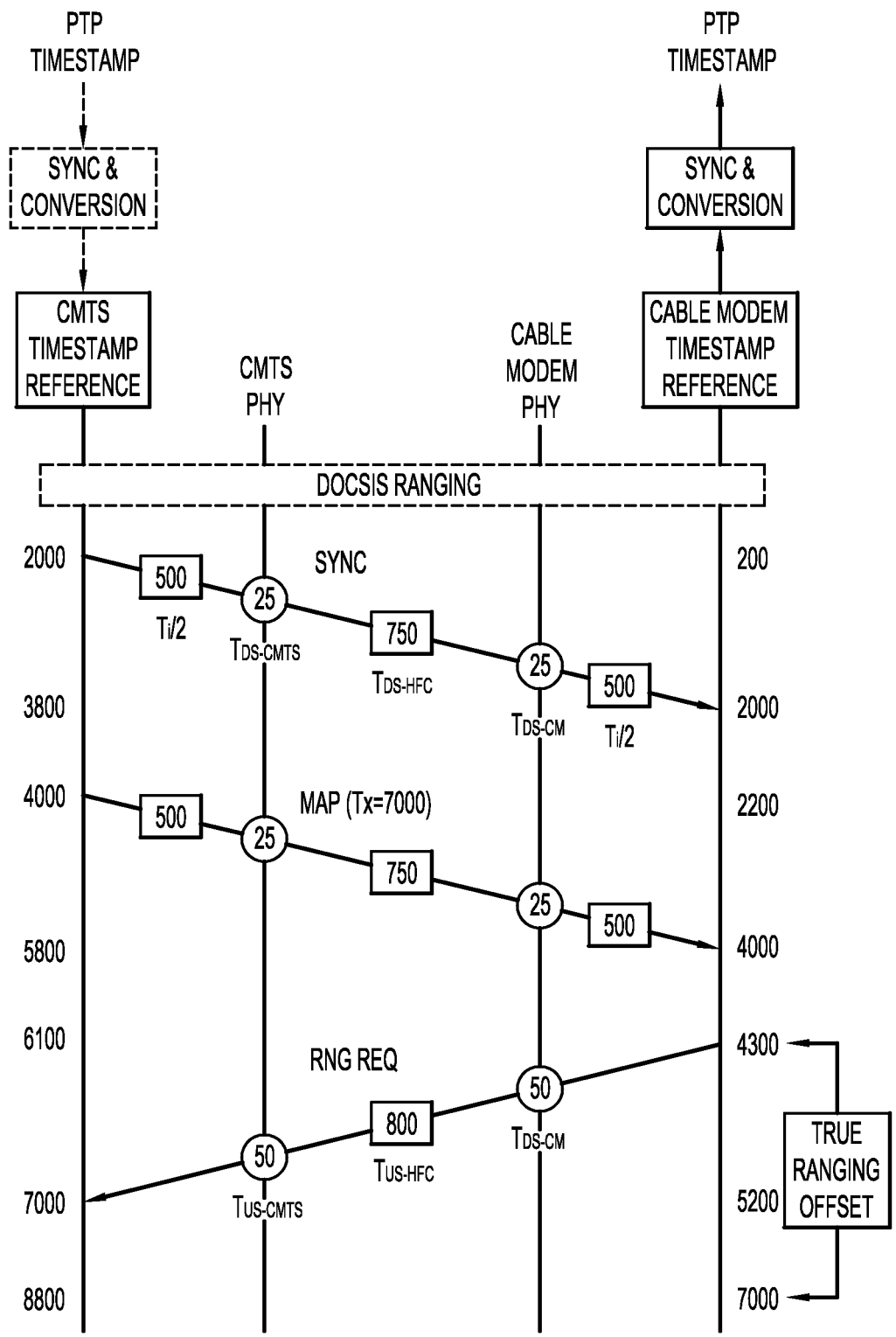
FIG. 10 is a flow diagram illustrating DOCSIS ranging and calculation of a true ranging offset (TRO).

FIG. 10 schematically illustrates an example of the true ranging offset calculation in configuration in which the DTP server includes a CMTS and the DTP client is a cable modem. The various boxes and circles in FIG. 10 schematically represent delays in the DOCSIS system. It is to be appreciated that somewhat arbitrary delay values are used for illustration purposes only. In this example, the upstream and downstream PHY delays are intentionally set to different values, and the upstream was given more delay than the downstream. This example shows how the CMTS can either receive network timing or operate without an external timing source. The cable modem timestamp is synchronized to the DTP timing source and converted to a PTP timestamp.

First, a SYNC messages traverses the DOCSIS network from the CMTS to the cable modem. The SYNC message includes the CMTS timestamp which is them used by the cable modem as its time stamp. In the example of FIG. 10, the SYNC message is sent at CMTS time 2000 and, accordingly, includes a CMTS timestamp of 2000. Due to the downstream delay, by the time the cable modem receives this timestamp and uses it as its own timestamp at a value of 2000, the CMTS timestamp has already advanced to 3800. As shown, the downstream delays of FIG. 10 include a first half of the interleaver delay (500), a CMTS PHY delay (25), a propagation delay in the network (750), a cable modem PHY delay (25), and the other half of the interleaver delay (500).

Next a MAP message is received that instructs the cable modem to transmit a packet to the CMTS such that it is received by the CMTS at a specific time. In this example, the MAP message identifies this specific time as 7000. However, due to the above described delays between the CMTS and the cable modem, if the cable modem were to transmit the requested packet when its timestamp is at 7000, the packet would not be received at the CMTS until well after the specified time. As such, the cable modem uses the above described ranging offset to determine a time for the cable modem to launch the packet so that it is timely received at the CMTS. In this case, the cable modem launches the packet when the cable modem timestamp is at 4300. The true ranging offset can be measured after the ranging process is complete by taking this difference of the timestamp in the MAP and the timestamp in the cable modem corresponding to the start time of upstream transmission in the MAP. In this case, the TRO is determined to be 2700.

The true ranging value is an offset that can be measured by the cable modem and reported to the CMTS. This value may not be exactly equal to the actual ranging value used in current implementations, since there may be other circuit delays involved in the use of this value. Any factor contributing to the round trip delay that is outside of the measurement path is not included in the measurement. However, if such delay factors can be defined, then a correction factor can be applied. For example, if there is a delay in the CMTS between the receive timestamp and the transmit timestamp, then the CMTS can calculate and provide a correction factor.

In theory, the true ranging offset could change with every ranging interval. Ranging intervals generally occur every 25 to 30 seconds. Such changes can occur if the delay of the plant increases due to, for example, temperature shifts. As a result, the cable modem may choose to time average the true ranging offset during a finite amount of time to remove this uncertainty. For DTP, this period should be selected to be sufficiently short so as to avoid impact on the cable modem's ability to react to network changes that would then impact non-DOCSIS timing signal (e.g., value of the PTP timestamp) at the output of the remote DTP client 25 (1).

Furthermore, the cable modem timestamp is also periodically updated as new SYNC messages are received. This update interval may be, for example, at least every 200 ms. Even though the CMTS and cable modem are frequency locked through the downstream PHY, if there is enough of a change in the delay of the downstream path, the timestamp value at the cable modem could be adjusted over time to the new value from the CMTS. This will also impact the PTP timestamp value.

The true ranging offset will be measured and stored during periodic ranging. As such, the natural packet to use for upstream measurements is then the DOCSIS MAC Ranging Request message. Alternatively, other approaches could be used that focus on a different MAC management message. In certain examples, the upstream packet may be contained within a single carrier (i.e., no bonding). Fragmentation, concatenation, and continuous concatenation and fragmentation (CCF) may be disabled. These requirements are met with the Ranging Response message.

Sometimes, a DOCSIS system uses a different upstream PHY profile for different upstream operations requests (e.g., ranging vs. data). A different modulation profile could result in a different upstream path delay. If the upstream delay is needed for other applications, this mechanism may create a correction factor, a different upstream message with which the measurement is made, or a ranging packet with the same PHY profile as the upstream data path.

As noted above, the round trip delay is now known and an approximation can be made of the time offset (i.e., the correction factor) needed for generation of a corrected non-DOCSIS timing signal at the DTP client. However, for optional further refinement of the precision timing output, it may be beneficial to determine some additional information for use in generating the correction factor. For example, the delay through the PHY at the CMTS and cable modem transmit and receive circuitry is not known. Furthermore, the asymmetry of the downstream path and upstream path is not known.

One simple approximation would be to subtract out the downstream interleaver delay, assume all four PHY delays are symmetrical, and that the remaining downstream and upstream DOCSIS paths are symmetrical, then divide the measured path in half as shown below in Equation 1:

$$\text{Approximate Offset} = (T_{rtt} - T_i)/2 + T_i \quad \text{(Equation 1)}$$

However, in certain circumstances this approximation may be insufficient. As such, described below are techniques for measuring the total asymmetry of the DOCSIS path, thereby enabling a more accurate offset to be calculated. The first step, however, is to derive the one-way delay in the downstream.

In example technique, a reference cable modem (e.g., reference DTP client 30(1) in FIG. 1) is provided for use in determining the one-way delay in the downstream and, ultimately, the asymmetry. In such techniques, the reference cable modem is identical in build (same manufacturer and same model) to the cable modem in the field (e.g., the remote DTP client 25(1) in FIG. 1). As such, measurements made at each of the reference cable modem and the remote cable modem may be easily compared. The CMTS is configured to program the reference cable modem with the same PHY configuration as the remote cable modem. Additionally, the same software is also loaded (although that is generally not under the control of the CMTS).

If there is more than one type of cable modem deployed in the field that is to provide precise time downstream, then there may have to be more than one reference cable modem. If there is more than one type of CMTS line card, then there may have to be a duplicate reference cable modem on each unique CMTS line card.

In operation, the DOCSIS system performs two measurements, namely a round trip measurement and a one-way downstream path delay measurement. The one-way downstream path delay measurement is made by connecting the output port (e.g., PTP master port or 1PPS output port) of the reference cable modem into an input port (e.g., PTP slave port or a 1PPS input port) on the DTP server 15. In examples in which an external DTI server with PTP slave port is used, the DTI server measures the difference between the PTP timestamp and the DOCSIS timestamp and reports it over the DTI interface to the CMTS.

In some examples, if the reference cable modem is correctly aligned, then the reported timestamp difference will be zero. At the DTI server, the PTP timestamp is converted to a DOCSIS timestamp to perform the math for these calculations. In one example, the PTP timestamp of the reference cable modem is adjusted until the error between the reference cable modem output and the CMTS timestamp, as measured externally, is minimal.

There are several different techniques that may be used to perform the offset calculations at the CMTS and/or the cable modem. In one exemplary technique, the downstream delay for the reference cable modem is a measured value with a near-zero HFC plant path length having an effect that is negligible on the calculations (i.e., a local connection), and is defined as follows in Equation 2. The references in Equations 2-9 are identified above in Table 1.

$$Tds\text{-}ref=Ti+Tds\text{-}cmts+Tds\text{-}cm \qquad \text{(Equation 2)}$$

The downstream delay for the remote cable modem differs by the path length of the HFC plant downstream, as shown below in Equation 3.

$$Tds=Tds\text{-}ref+Tds\text{-}hfc \qquad \text{(Equation 3)}$$

The round trip time for the reference cable modem is a measured value with a near-zero HFC plant path length, and is defined as follows in Equation 4.

$$Trtt\text{-}ref=Ti+Tds\text{-}cmts+Tds\text{-}cm+Tus\text{-}cm+Tus\text{-}cmts \qquad \text{(Equation 4)}$$

As shown below in Equation 5, the round trip time for the remote cable modem differs by the path length of the HFC plant downstream.

$$Trtt=Trtt\text{-}ref+Tds\text{-}hfc+Tus\text{-}hfc \qquad \text{(Equation 5)}$$

A linear correction factor, referred to as Tus-off may be assigned to the HFC plant asymmetry. Tus-off is an expression of the additional amount of the upstream delay when compared to the downstream delay. Tus-off could be assigned based upon an operator's knowledge and characterization of the plant. For example, Tus-off could account for group delay differences between the DOCSIS downstream and upstream carrier frequencies. Tus-off does not represent any asymmetry within the hardware of the CMTS or the remote cable modem if the correction calculated through the reference cable modem removes that asymmetry.

For example, if Tus-off is equal to 50 ns, then the upstream path would have 50 ns more latency than the downstream path. Tus-off is represented below in Equation 6, while Equation 7 represents a re-arrangement of Equation 6 to solve for Tus-hfc.

$$Tus\text{-}off=Tus\text{-}hfc-Tds\text{-}hfc \qquad \text{(Equation 6)}$$

$$Tus\text{-}hfc=Tds\text{-}hfc+Tus\text{-}off \qquad \text{(Equation 7)}$$

As shown below, applying equation 7 to equation 5 and solving for the downstream HFC delay, results in Equation 8

$$Trtt=Trtt\text{-}ref+Tds\text{-}hfc+Tds\text{-}hfc+Tus\text{-}off$$

$$Tds\text{-}hfc=(Trtt-Trtt\text{-}ref-Tus\text{-}off)/2 \qquad \text{(Equation 8)}$$

Applying equation 8 to equation 3 yields the final equation for the offset of the downstream timestamp in Equation 9.

$$Tds=Tds\text{-}ref+(Trtt-Trtt\text{-}ref-Tus\text{-}off)/2 \qquad \text{(Equation 9)}$$

Applying Equation 9 to the example in FIG. 10 with no HFC correction factor (Tus-off=0 ns) and where the plant length is 0 for the reference cable modem yields:

Tds=1050+(2700−1150)/2=1825, and correcting for
HFC plant asymmetry using the value from the
example for Tus-off=800−750=50, Tds=1050+(2700−1150−50)/2=1800

As an alternative calculation, the asymmetry could be expressed as a ratio of Tds-hfc and Tus-hfc.

Figure 11A:
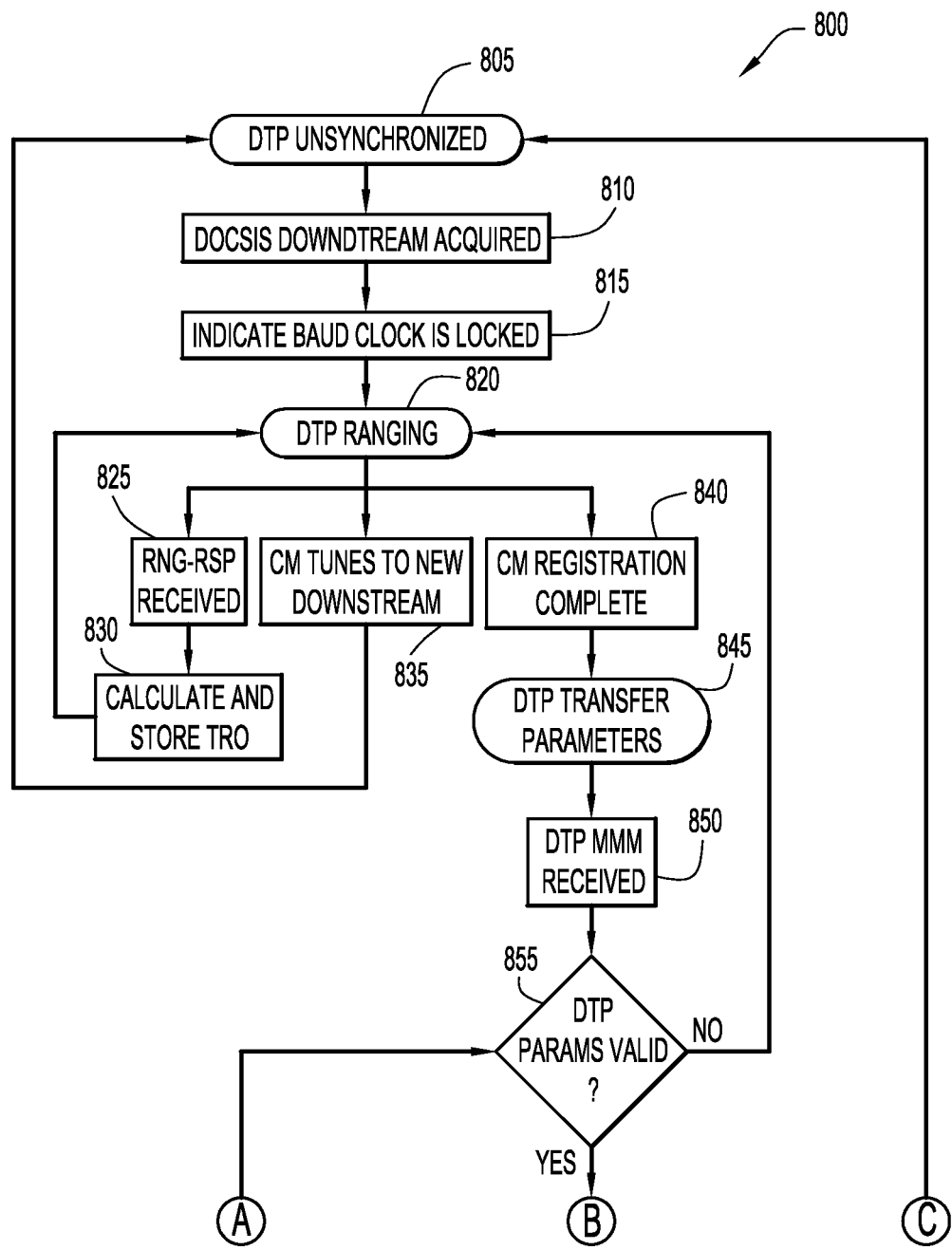
FIGS. 11A and 11B depict a flowchart illustrating operations of a DTP client.
Figure 11B:
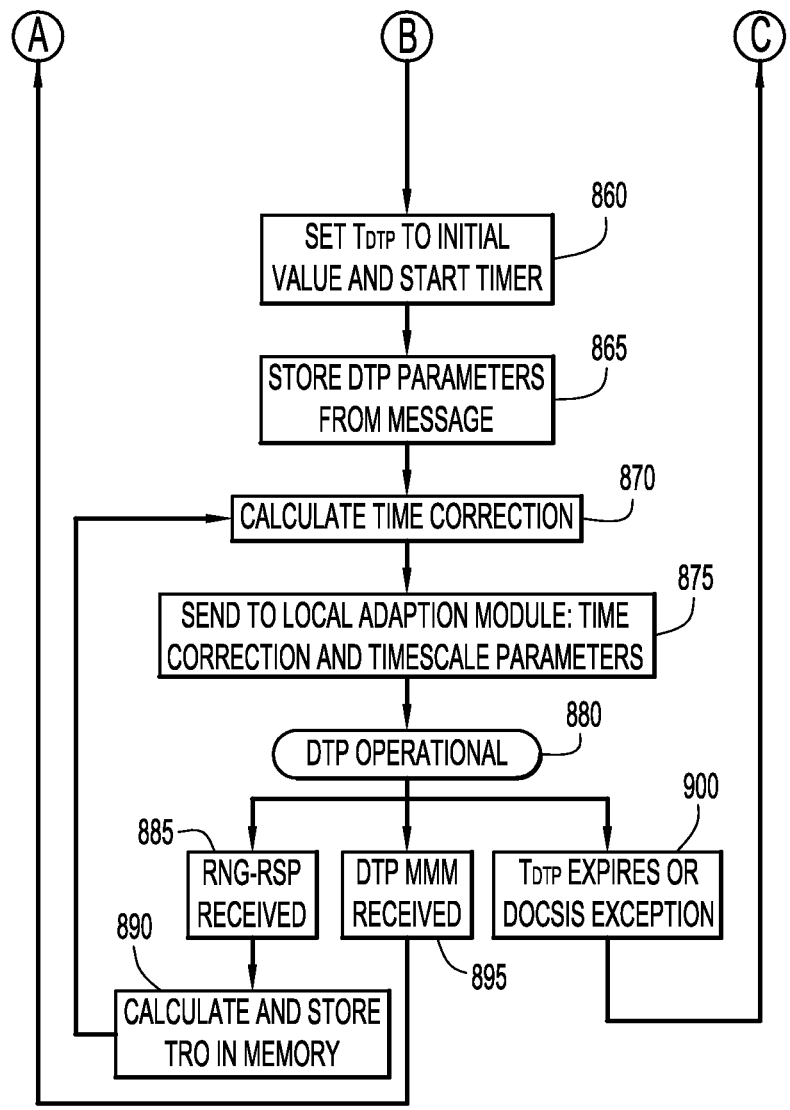

FIGS. 11A and 11B illustrate a flowchart of one example DTP method 800 executed at a remote DTP client which is, in this example, a cable modem.

Method 800 begins at 805 where the cable modem is initially in an unsynchronized DTP state. At 810, the cable modem acquires the DOCSIS downstream clock (e.g., QAM) and at 815 an indication is provided (i.e., to the hardware) that the baud clock has been locked. At 820, the cable modem enters into a DTP ranging state in which the cable modem attempts to establish various correction factors for later use.

More specifically, in the DTP ranging state, a RNG-RSP may be received at 825 in the normal DOCSIS ranging process. This allows the cable modem to calculate the true ranging offset at 830 (as described above) and store the true ranging offset for later use. This process allows for calculation of a true ranging offset prior to completion of the cable modem registration process (described below) and operates until the registration process is complete.

Alternatively, during the DTP ranging state the method 800 may proceed to 835 where some error is detected in the cable modem and the cable modem needs to tune to a new downstream clock. Alternatively, the method 800 may proceed to 840 where the cable modem registration is complete, meaning that the DOCSIS system now includes a two-way cable modem.

After registration is complete, the cable modem may enter a DTP parameter transfer state at 845. Within this state, the method 800 includes at 850 the receipt of the new DTP MAC Management Message from the DTP server. As described elsewhere herein, the MAC Management Message includes one or more different parameters used by the cable modem to convert DOCSIS time to a corrected downstream time (i.e., PTP). At 855, a check is performed to determine if the received DTP parameters (in the MAC Management Message) are valid and/or present. If not, the method 800 returns to 805 to wait for a corrections/updates.

If the DTP parameters are valid/present, the method 800 proceeds to 860 for a keep-alive process. In this process, a reference DTP time ($T_{DTP}$) is set to an initial value and a keep-alive timer is started. This timer is used because new MAC Management Messages (and DTP parameters) may be periodically or occasionally received and this process is used to ensure that the stream maintains suitability for DTP. For example, if the timer reached a certain predetermined time without receiving a new MAC Management Message, the cable modem can infer that there is a problem and initiate a corrective action.

At 865, the DTP parameters from the received MAC Management Message are stored. At 870, a time correction factor used in the calculation of the corrected downstream time is generated. At 875, the time correction and timescale parameters are sent to a local adaption module on the cable modem (i.e., a functional module on the cable modem generating the corrected timing information using DTP).

At 880, the cable modem enters a DTP operational state where timing is provided to one or more downstream devices based on DTP parameters. Within the DTP operational state, a RNG-RSP may be received at 885 that, as described above, allows the cable modem to calculate (or re-calculate) the true ranging offset at 890 (as described above) and store the true ranging offset for later use.

Alternatively, during the DTP ranging state the method 800 may proceed to 895 where a new MAC Management Message (MMM) is received. If such a new message is received, method 800 can return 870 for calculation of a new time correction factor. Following calculation of the new time correction factors, the new time correction and timescale parameters are sent to the local adaption module on the cable modem. Receipt of the new MAC Management Message may also reset the timer of 860.

Alternatively, in the DTP operational state method 800 may proceed to 900 where the timer of 860 expires or a DOCSIS exception occurs. In this case, the method 800 may return to the DTP unsynchronized state of 805.

As noted above, various signaling/messaging occurs between a DTP server and a DTP client in order execute DTP so that DOCSIS timing may be used to create a corrected downstream timing at the DTP client. This signaling is referred to as DTP messaging and is described in detail below. In accordance with the following description, the DTP server is arranged as a CMTS (without an external or internal DTI server), and the DTP client is a cable modem.

The following description makes specific reference to generating PTP timing at the cable modem and uses the same EPOCH as PTP. Additionally, in this example, the DOCSIS 32-bit timestamp is modified to include upper bits (upper DTP bits) and lower bits (lower DTP bits).

In general, there are two ways of managing the relationship between the DOCSIS timestamp and the EPOCH. In particular, the CMTS could (1) align the DOCSIS 32-bit timestamp such that it is only necessary to add upper bits, or (2) the DOCSIS timestamp could start on an arbitrary boundary and generate an offset that is added to the current timestamp, thus altering the timestamp value. In the first case, the CMTS (when it boots) aligns with an external timestamp and then changes the value of the DOCSIS timestamp to match it. This process results in a reset of all cable modems connected to the CMTS. The restart of the cable modems can be delayed if time lock is done during reset. However, if the CMTS is free running, then it can perform a calculation at boot time and adjust the timestamp (if needed). As such, this first technique would generally only be used when the CMTS is free running In the second technique, the CMTS boots, brings the connected cable modems on-line, and proceeds with clock sync. The EPOCH offset adds upper bits (i.e., upper DTP bits) and changes the value of the 32 bit timestamp. It will also impact the value of the lower order bits since the lower order bits are aligned to the DOCSIS timestamp edge and the EPOCH offset may have a higher level of accuracy than 99.97 ns (the clock period of DOCSIS). The second technique is usable for free running or for external locking to PTP. It should also be extensible to other clocking schemes such as NTP.

A DOCSIS 32 bit timestamp has a roll-over time as given below in equation 10

$$(1/10.24 \text{ MHz})*2^{32}/10^{6}/3600=6.99 \text{ minutes} \quad \text{(Equation 10)}$$

An addition of 24 upper bits provides a roll-over time as given below in equation 11:

$$6.99 \text{ minutes}*2^{24}/60/24/365 \sim =223 \text{ years} \quad \text{(Equation 11)}$$

To get 99.97 ns to less than 1 ns of resolution can be done within 8 lower bits (lower DTP bits). Thus, the total size of the DOCSIS DTP timestamp is 24 upper DTP bits, 32 standard DOCSIS bits (middle bits, and 8 lower DTP bits, for a total of 64 bits.

There are several techniques for implementing the lower order bits. In a first such technique, the system could create lower order bits with a clock derived (multiplied up) from the 10.24 MHz DOCSIS clock and then convert to the external clock, such as PTP. In a second technique, the system could create lower order bits with the time base of the external clock (e.g., 1 ns for PTP) and conversion is performed on the upper order bits (timestamp and EPOCH offset). In a third technique, the system could leverage the SCMDA M/N scheme to create an arbitrary time base.

In accordance with the first above noted technique (i.e., using a 10.24 MHz base clock), the cable modem and CMTS would independently run a clock that is 128 or 256 times as fast as 10.24 MHz. This would locally generate the lower 8 bits. The choice of multiple may vary for different implementations and may depend upon, for example, the accuracy of the local clock circuit.

To achieve local alignment, the PLL of the cable modem will generate a HF clock that is phase aligned with the 10.24 MHz clock. The HF clock drives an eight bit counter. When there is a rising edge on the 10.24 MHz clock, the lower order bits should be all zeros. Once initialized, they will stay in alignment.

To achieve global alignment, the 64 bit DTP timestamp at the cable modem is aligned with the 64 bit DTP timestamp at the CMTS through the DTP Ranging process. As noted above, part of the DTP ranging process results in the determination of the true ranging offset. The true ranging offset can be measured with the 64 bit DTP timestamp to get sub-ns accuracy (depending upon the accuracy of the cable modem clock).

The correction factor from the CMTS to the cable modem will be a 64 bit value. This 64 bit value would be added to the 32 bit timestamp when the timestamp hits a particular value. In DOCSIS terminology, this is a Timestamp snapshot. This will convert the 32 bit timestamp to a 64 bit DOCSIS EPOCH.

In order to convert to an external time base (such as PTP), there will be an offset for EPOCH and a multiplier for the different time base. The offset for PTP is 0 since PTP and DTP share a common EPOCH.

When the DTP timestamp is converted to the local interface timestamp (e.g., PTP), there will be a round-off error that will be related to the larger LSB interval time of either DTP or PTP. So, if DTP is sub-ns and PTP is 1 ns, then the round-off error will be on the order of 1 ns. If the DTP timestamp is 10 ns accurate and PTP is 1 ns accurate, the round-off error is on the order of 10 ns. This technique does not use the M/N method from SCDMA.

In the second technique (using a ns clock), the timestamp that is sent from the CMTS to the cable modem is 32 bits and is based upon a 10.24 MHz clock (99.7 ns). PTP needs a 1 ns clock that is locally generated by a PLL with a multiplier/divider. The relationship between the DOCSIS timestamp (10.24 MHz) with the lower order bits (1 GHz) and the PTP timestamp (1 GHz) is:

$$10.24 \text{ MHz} \times (3125/32) = 1 \text{ GHz}$$

$$97.7 \text{ Ns} \times (32/3125) = 1 \text{ ns}$$

The lower order bits append to the DOCSIS timestamp. The 1 ns clock generated is used to generate a PTP timestamp.

The fundamental operation of DTP (with specific reference to PTP) is that there are two time bases, DTP and PTP. (As noted, PTP is merely used for illustration purposes). The cable modem and CMTS would run both time bases and measure an error between them. It would then feed that error back into the time base that needed adjusting. For example, when the CMTS receives PTP via a PTP slave, the error signal between PTP and DTP would be fed into the DTP clock circuit. In the cable modem, where there is a PTP master, the error signal between PTP and DPT would be fed into the PTP circuit.

As noted above, there is some specific DTP Messaging between the CMTS and the cable modem. More particularly, the true ranging offset may get updated after each RNG-RSP from the CMTS. The asymmetrical delay does depend upon the choice of the downstream and upstream channel. For that reason, the signaling could be matched up with UCD messages for the US and MDD message for the downstream.

In one example, these messages are assembled as a new DOCSIS message referred to above as the MAC Management message. In another example, the messages will be embedded within an existing DOCSIS MAC message. There may also be different messaging techniques, a few examples of which are described below.

In a first messaging technique, referred to as the "CMTS push method," a SYNC message is transmitted from the CMTS to the cable modem. The SYNC message delivers the 32 bit DOCSIS timestamp. Next, a clock information message is transmitted from the CMTS to the cable modem. A portion of this clock information message (the global offset/snapshot) may be part of the UCD message and/or a portion may be unicast. Furthermore, a DTP timestamp snapshot is transmitted to the cable modem. This DTP timestamp snapshot has a 64 bit value referenced to the CMTS. The same value is provided to all cable modems and it converts the DOCSIS timestamp to the DTP EPOCH. A method for converting from the DTP EPOCH to the correct timing EPCOH (e.g., PTP EPOCH or NTP EPOCH) would executed and does not need to be communicated in the messaging. The DTP timestamp snapshot could alternatively be implemented as an offset.

A cable modem correction factor may then be transmitted. This correction factor takes into account the distance (derived from the true ranging offset), path asymmetry of each cable modem (derived from configuration information such as interleaver depth, QAM configuration, etc.), and the measured values from the reference cable modem. In one alternative, the timestamp snapshot and correction factor could be rolled into one unicast offset. In another alternative, the cable modem stores the true ranging offset after each ranging adjustment and applies that number locally. The CMTS only supplies the asymmetry factor and the DTP Timestamp snapshot. In a still other alternative, the CMTS provides raw data to the cable modem and the cable modem calculates the asymmetry factor.

There may also be a measurement request from the CMTS to the cable modem. This would request the cable modem to make a true ranging offset measurement and send it to the CMTS. Furthermore, there may be a measurement response from the cable modem to the CMTS in which the true ranging offset is provided to the CMTS. As noted above, the true ranging offset is the difference between the value of the reference cable modem timestamp when it actually begins transmission of an upstream packet on the wire (without the ranging offset included), and the value of the anticipated timestamp at the CMTS receiver when that first bit arrives (this is the timestamp value in the MAP message).

A second messaging technique is referred to a "cable modem pull method." In this method, a SYNC message is transmitted from the CMTS to the cable modem along with a DTP correction factor. This DTP correction factor could be added to the RNG-RSP message. Next, there is a DTP-REQ message from the cable modem to the CMTS. This message is sent when the true ranging offset changes and status is periodically sent (DTP lock/no lock). In such examples, the CMTS should know the modem type from registration or this could be added to the RNG-REQ message. Finally, there may be a DTP-RSP message from the CMTS to the cable modem. This message includes the DTP upper bits and the DOCSIS-PTP conversion. This could be added to the RNG-RSP message.

In certain examples, there are also messages between the CMTS and a DTI server that could be embedded within the existing DTI protocol. If the PTP network port is on the DTI server, the functionality is limited to a boundary clock operation as PTP is terminated on the DTI server in this case. If the PTP network port is on the CMTS, then the CMTS could implement boundary clock or transparent clock. Packets subject to transparent clocking need to be timestamped at CMTS ingress and the timestamp needs to propagate with the packet to the CM egress.

Furthermore, there is a timestamp message from the DTI server to the CMTS. This includes the 32-bit DOCSIS timestamp and lower DTP bits sent directly as the DTI interface is capable of sub-ns accuracy. The upper DTP timestamp extension, assuming the DTI server has network clock input, is, for example, PTPv2 which has 80 bits (48 bits of seconds, 32 bits of ns) or NTPv4 which has 128 bits (NTP can determine the extra 48 bits). There may also be a 32 bit Clock Domain identifier (ID), which is specific to PTP.

There may also be a measurement request from the CMTS to the DTI server. This may include the address (e.g., IP, MAC) of a cable modem to be measured. There may also be a measurement response from the DTI server to the CMTS. This message would include the difference between the difference from PTP timestamp to DOCSIS timestamp from the reference cable modem.

Figure 12:
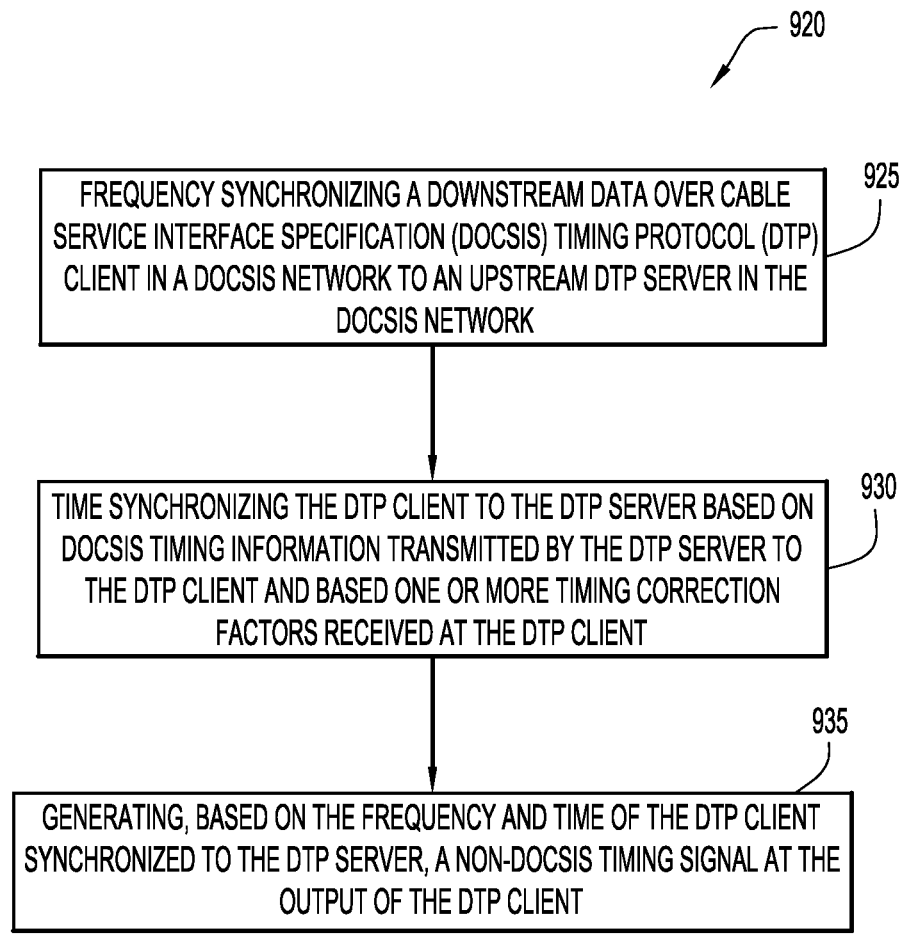
FIG. 12 is a flowchart illustrating an example method executed in accordance with the DTP.

FIG. 12 is a high level flowchart illustrating an example method 920 executed in accordance with the DTP. Method 920 begins at 925 where a downstream Data Over Cable Service Interface Specification (DOCSIS) Timing Protocol (DTP) client in a DOCSIS network is frequency synchronized to (with) an upstream DTP server in the DOCSIS network. At 930, the DTP client is time synchronized to the DTP server based on DOCSIS timing information transmitted by the DTP server to the DTP client and based one or more timing correction factors received at the DTP client. At 935, based on the frequency and time of the DTP client synchronized to the DTP server, a clock signal is generated at the output of the DTP client in accordance with a non-DOCSIS timing signal.

Figure 13:
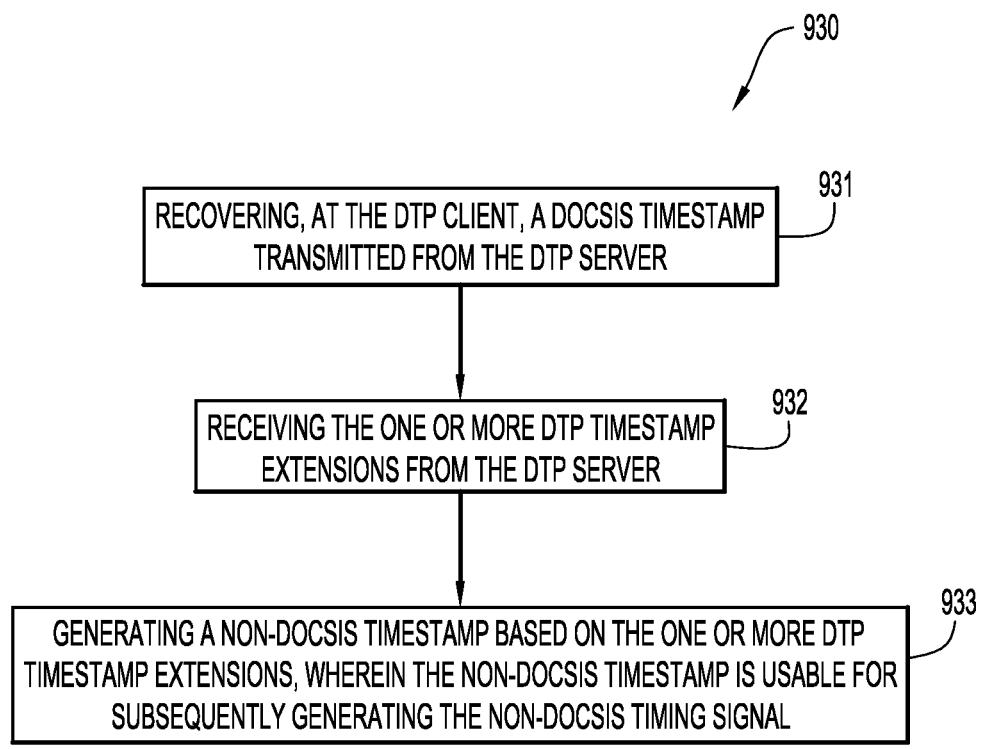
FIG. 13 is a flowchart illustrating operations performed to time synchronize a DTP client to a DTP server.

FIG. 13 is a flowchart illustration further details of the time synchronizing process at 930 of FIG. 13 where the one more timing correction factors comprise DTP timestamp extensions. More specifically, at 931 a DOCSIS timestamp transmitted from the DTP server is recovered at the DTP client. At 932, the one or more DTP timestamp extensions from the DTP server are received at the DTP client. At 933, a non-DOCSIS timestamp is generated based on the one or more DTP timestamp extensions, wherein the non-DOCSIS timestamp is for use in generating the non-DOCSIS timing signal (e.g., a clock signal in accordance with the non-DOCSIS timing protocol). In certain examples, the one or more DTP timestamp extension comprise higher order bits configured to align the DOCSIS timestamp with a protocol time reference point associated with the non-DOCSIS timing protocol and lower order bits configured to increase a resolution of the DOCSIS timestamp.

Many of the functions described herein may be performed by software. To this end, the software is stored or encoded in a memory that may comprise read only memory (ROM), random access memory (RAM), magnetic disk storage media devices, optical storage media devices, flash memory devices, electrical, optical, or other physical/tangible memory storage devices. The software is executed by a microprocessor or microcontroller. Thus, in general, the memory may comprise one or more computer readable storage media (e.g., a memory device) encoded with software comprising computer executable instructions and when the software is executed it is operable to perform the operations described herein.

It is to be appreciated that the above described operation of the DTP (and related techniques) may be used in variety of different arrangements and architectures. For example, some customers, such as residential customers (e.g., for home femtocell), may just need a high quality timing source without being concerned about its traceability. Other customers, such as power utility companies, mobile or broadcast operators may need information about the timing source in order to correlate time between distinct end devices that need to be synchronized. This level of information may be requested for traceability or accountability. Moreover, the operator providing a timing service to its customers may also have its own constraints that drive them to distinct timing distribution architecture. The following provides illustrations of several deployment scenarios and related variations. These scenarios provide distinct timing infrastructures from the end user and/or operator viewpoint and offer flexibility to the timing infrastructure. However, each scenario may utilize specific configurations at the DTP server and DTP client.

Figure 14A:
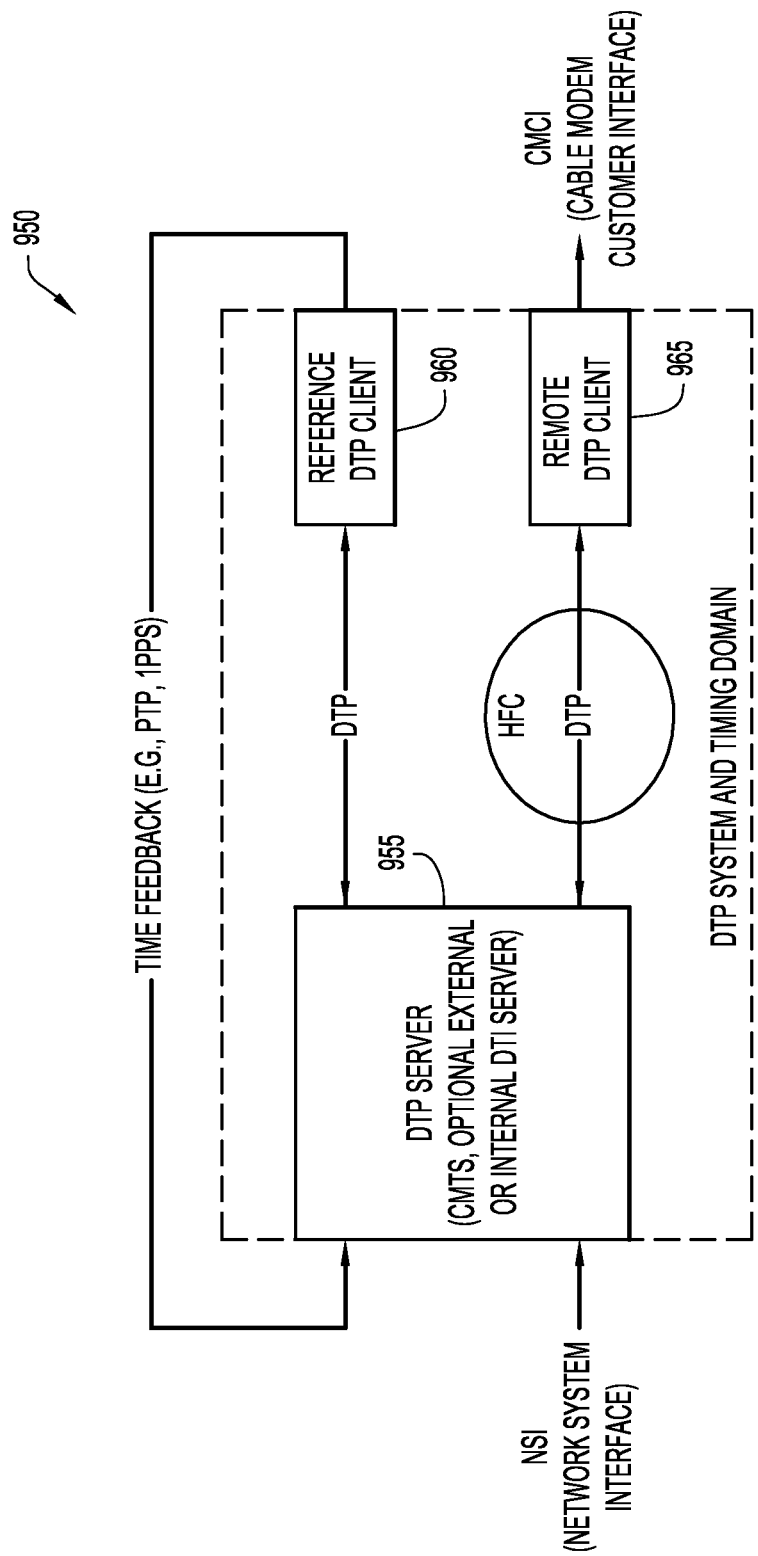
FIGS. 14A and 14B are block diagrams of a DTP system.
Figure 14B:
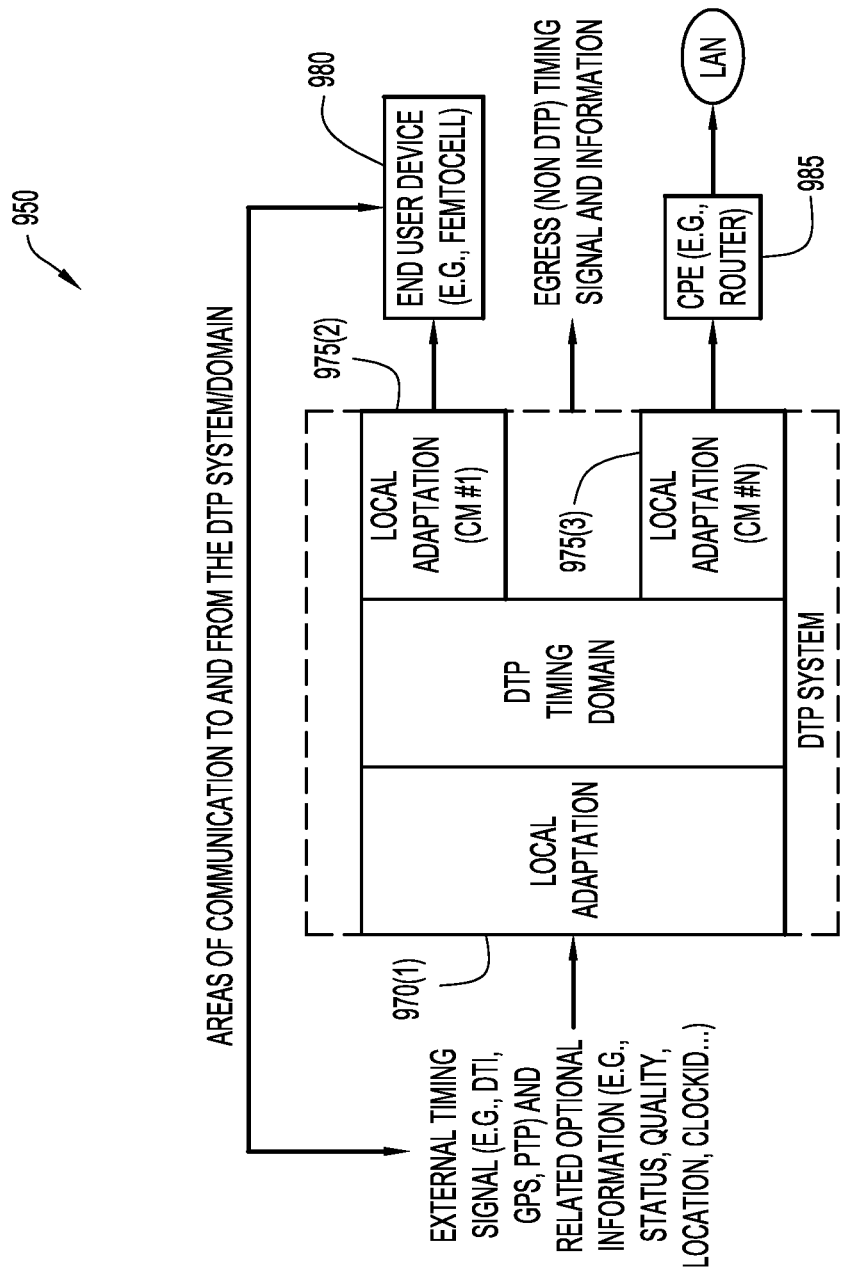

FIGS. 14A and 14B are schematic diagrams illustrating the basic arrangement of a DTP system 950 that may deployed in the various following scenarios. As shown in FIG. 14A, the DTP system 15 includes a DTP server 955, a reference DTP client 960, and a remote DTP client 965. The DTP server 955 includes a CMTS that may optionally include an external or internal DTI server. The reference DTP client 960 and remote DTP client 965 have substantially the same configuration and they are each cable modems. However, the reference DTP client 960 is connected to the DTP server 955 via a local connection while the remote DTP client 965 is connected to the DTP server 955 by an HFC plant.

FIG. 14B illustrates local adaptations for execution of the DTP. More specifically, a local adaptation 970(1) is implemented on the DTP server 955, local adaptation 975(2) is implemented on a first remote DTP client 965(1), and a local adaptation 975(3) is implemented on a second remote DTP client 965(2). In this example, local adaptation 975(2) provides timing (clock signal) to an end user device 980 (e.g., femtocell). Additionally, local adaptation 975(2) provides timing to Customer Premise Equipment (CPE) (e.g., router) 985.

Figure 15A:
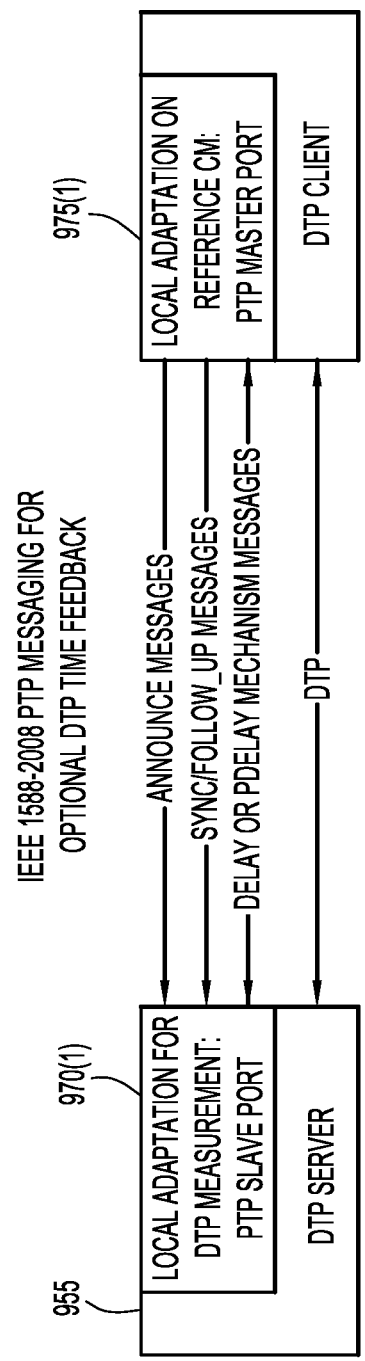
FIGS. 15A and 15B are block diagrams illustrating communication between a DTP server and reference DTP client(s).
Figure 15B:
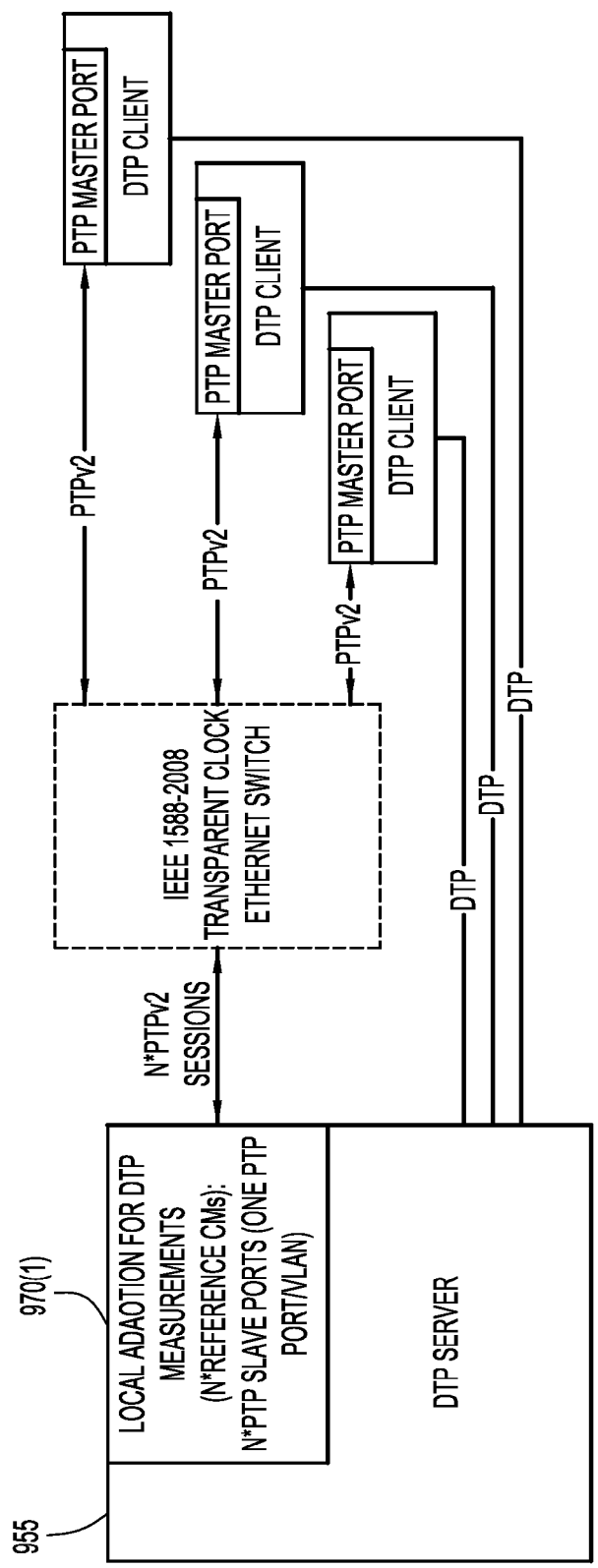

FIGS. 15A and 15B are schematic diagrams illustrating communication between the DTP server 955 and the reference DTP client 960. In general, the communication illustrated in FIGS. 15A and 15B may occur in the various deployment scenarios.

FIGS. 16A-16D are schematic diagrams illustrating a first scenario executing timing source identification towards end systems (e.g., a PTP device connected to DTP client). In these examples, a time source (e.g., a DTI server) provides a precise time signal 1000. The DTP system 950 uses the sourced timing 1000 to generate a PTP clock signal at the output of the DTP client(s).

Figure 16A:
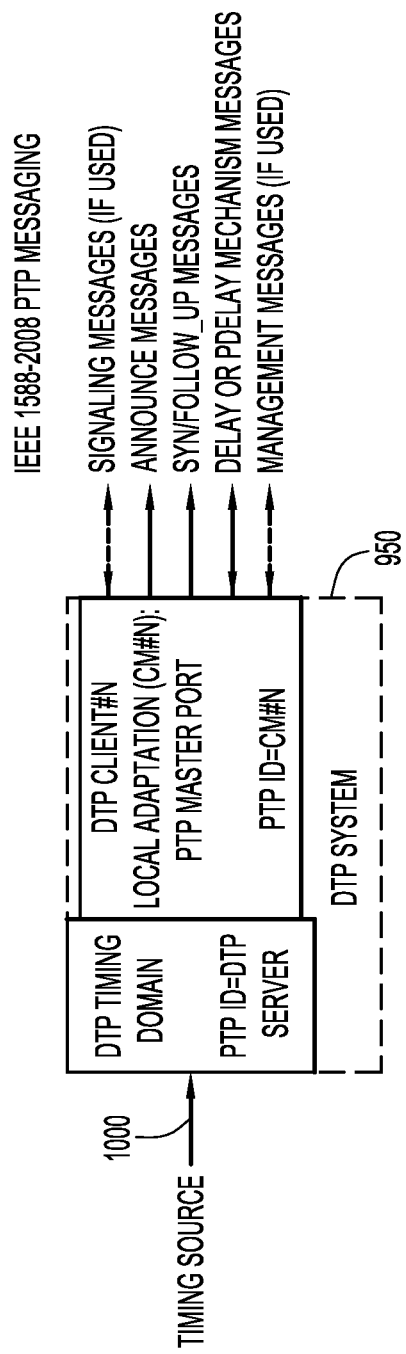
FIGS. 16A-19B are block diagrams illustrating example implementation scenarios of a DTP system.
Figure 16B:
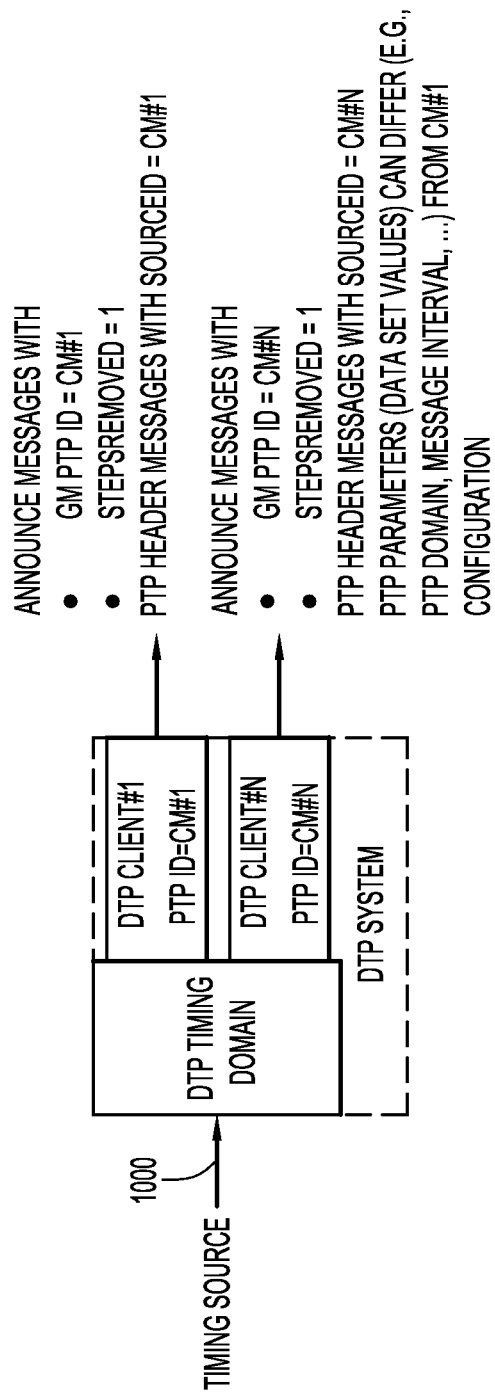

In the example of FIG. 16B, the DTP client operates as an IEEE 1588 grandmaster (GM) using the sourced timing 1000 via the DTP. The DTP server (e.g., CMTS/DTI server) also provides some timing source information so that the DTP client's GM function can populate the PTP dataset members transmitted to the downstream PTP devices. In this example, the DTP client provides its own clockID for grandmaster identifier (GM ID).

Figure 16C:
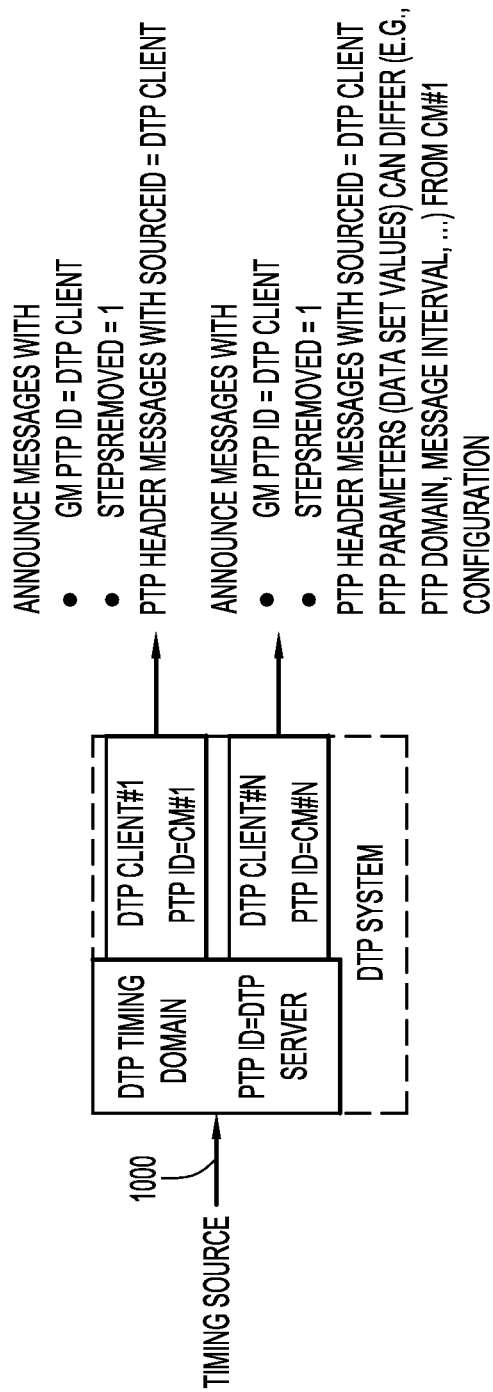
Figure 16D:
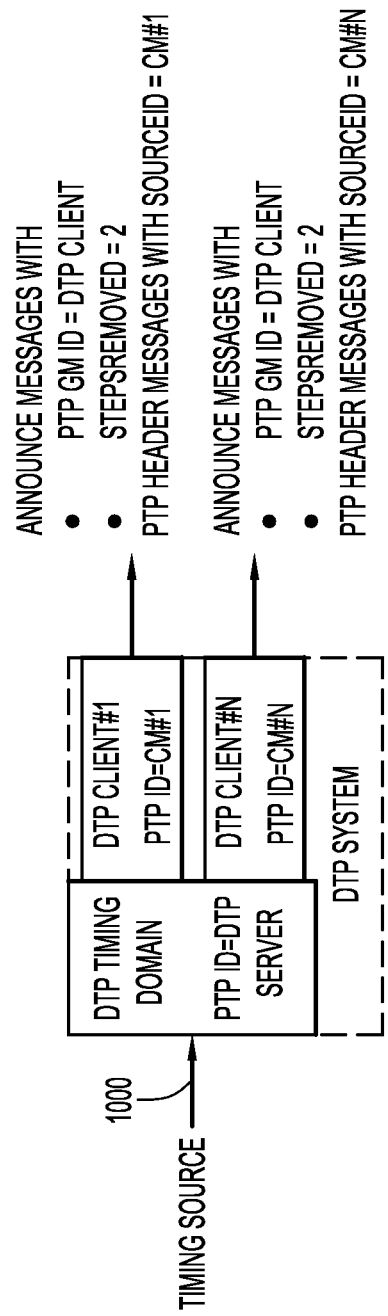

Utilizing the same DTP distribution variants in the examples of FIGS. 16C and 16D allow the PTP clocks beyond the DTP clients to trace the real-timing source and identify the DTP server as GM. In such scenarios, the DTP clients use the DTP server (e.g., DTI server or CMTS) PTP clockID for the GM ID. More specifically, in the example of FIG. 16C, the DTP client remains the real IEEE 1588 GM, but replaces its own clockID by the DTP server ClockID.

In the example of FIG. 16D, despite the fact that there are no PTP messages being sent over the cable path to the DTP client, the DTP client simulates a boundary clock. The DTP client generates PTP messages with its own clockID (as PTP SourceID), but uses the DTP server PTP clockID for GM ID. As a result, all DTP clients connected to this DTP server would be related to same "GM". This arrangement may be useful for providing PTP traceability to the "GM" while providing the distinct IDs of the DTP clients. In contrast, in the example of FIG. 16C, the DTP client would substitute for (i.e., fake) the DTP server as GM.

When the primary or a backup timing source and IEEE 1588 GM are remote to the DTP server (e.g., DTI Server/CMTS) locations (for instance somewhere in the aggregation or core network), other scenarios are conceivable. From a timing domain viewpoint, the main difference is to have the same source/GM for multiple customer clocks. Those clocks might be spread over multiple CMTSs, HFC plants and, also accessible from other access networks (e.g., Ethernet). Such scenarios may include the transmission of the timing references towards the DTP server location and then to the PTP clocks beyond the DTP clients. As shown FIG. 17A, the DTP server (e.g., DTI server/CMTS) has no local timing source. The timing source (e.g., GPS) and GM are remote.

Transmission of timing signals from reference(s) over a packet network towards the cable plants can be achieved by the normal TWTT protocol with network assistance as described earlier (e.g., Synchronous Ethernet for physical-layer frequency, hardware assistance to PTP or NTP packets).

Figure 17A:
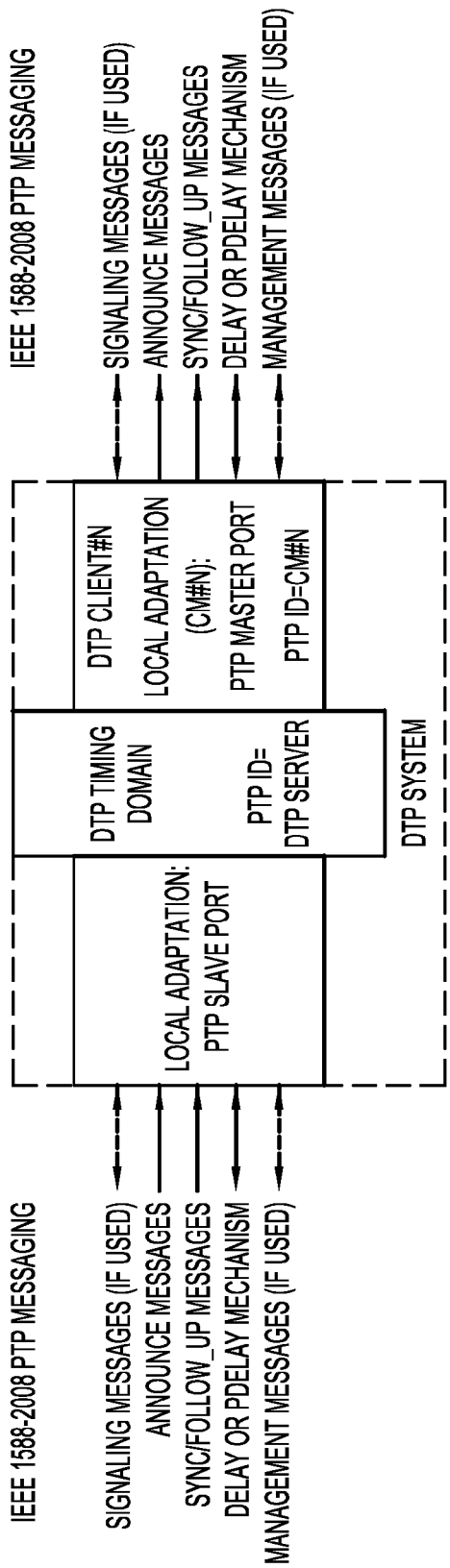

In one example of FIG. 17A, the DTP server and the DTP client conceptually can behave as in any previous examples of FIGS. 16B-16D. The difference in this case is that the DTP server will use the network timing signal(s) (e.g. Synchronous Ethernet and IEEE 1588 PTP) instead of a local timing source (e.g., GNSS receiver or DTI server). However this scenario does not provide traceability to the actual timing source and IEEE 1588 GM. In other words, the DTP system hides to DTP clients the DTP domain as well as the PTP domain the DTP system is synchronized to (i.e., the DTP system does not use the PTP GM ID in its PTP messages to customer equipment).

Hiding or removing the traceability to the central GM may be intentional, for instance, for delimitation of the timing and/or management domain towards the customer network. The information at the DTP client is defined at the DTP server. However, because the information sent by the CMTS to the CM comes from the GM via the DTP server, the operator can trace back to the real GM.

Figure 17B:
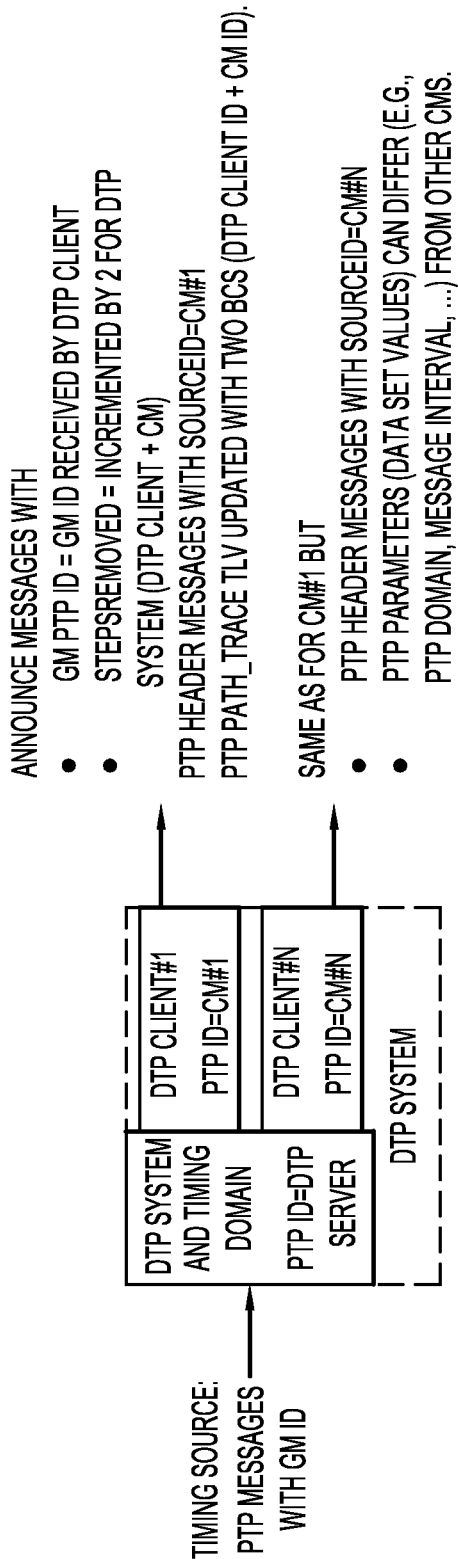
Figure 17C:
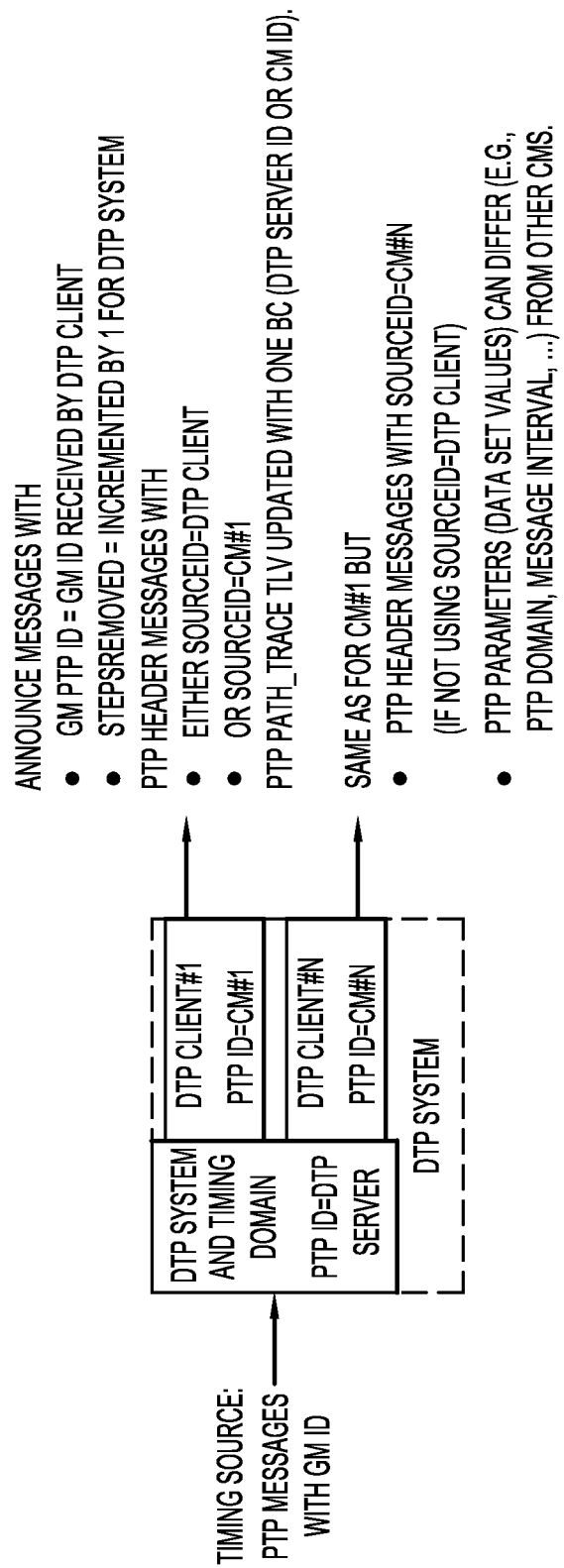

In the example of FIG. 17B, the DTP system runs a boundary clock (BC) function and behaves as one BC (distributed BC). PTP messages to customer equipment use DTP system clock ID which can be either the DTP server clock ID or the CM ID. In the example of FIG. 17C, the DTP server and the DTP clients behave as distinct BCs (discrete BCs).

The differences between FIGS. 17B and 17C (i.e., differences between the one BC and two BCs scenarios) come from the clockID being used for traceability and from the count of PTP hops. In case of one BC scenario (FIG. 17B), the clock SourceID may be the clockID of the DTP server and the PTP SourceID would have to be the same in order to represent the BC. The BC hop count (PTP "removeStep" dataset member) would be incremented by one. For a two BC scenario (FIG. 17C), the DTP server and the DTP client use their respective clockID (e.g., for path_trace TLV) and the BC hop count would have to be incremented by two. This is again a distinction related to PTP communication management and monitoring.

Figure 18A:
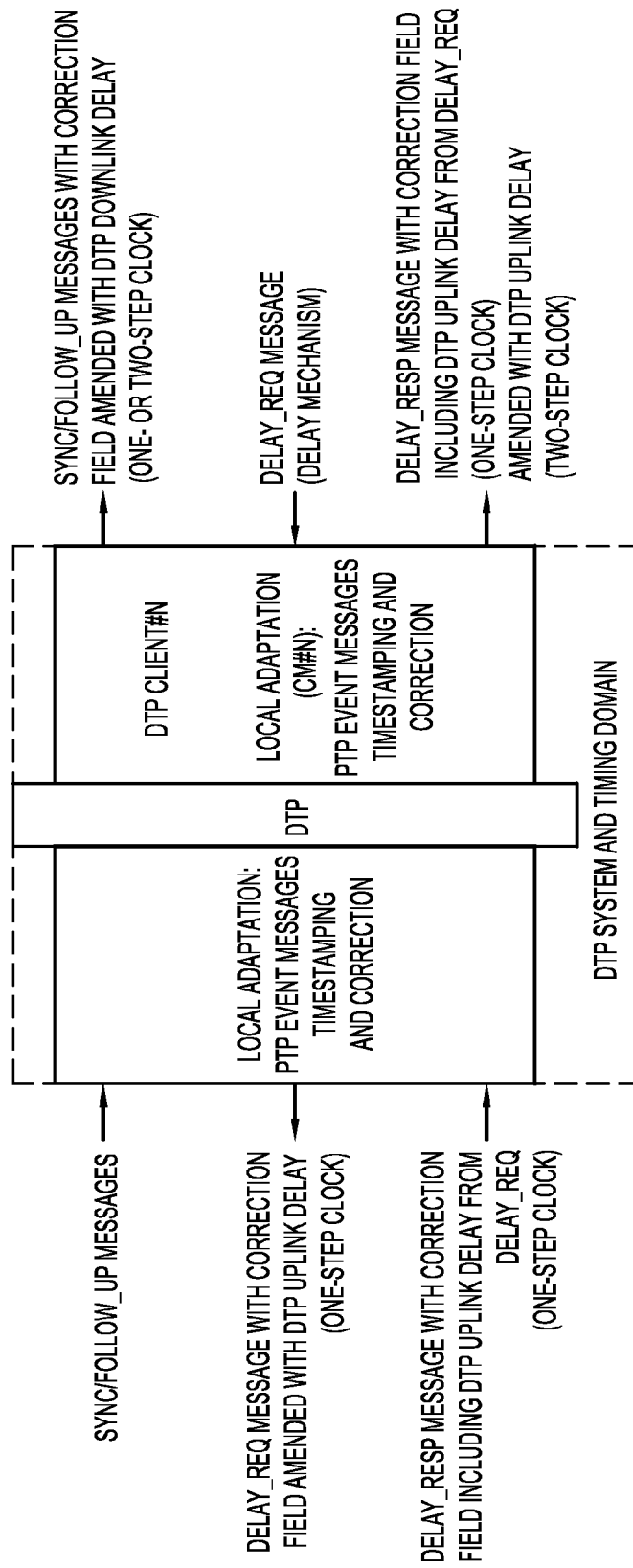
Figure 18B:
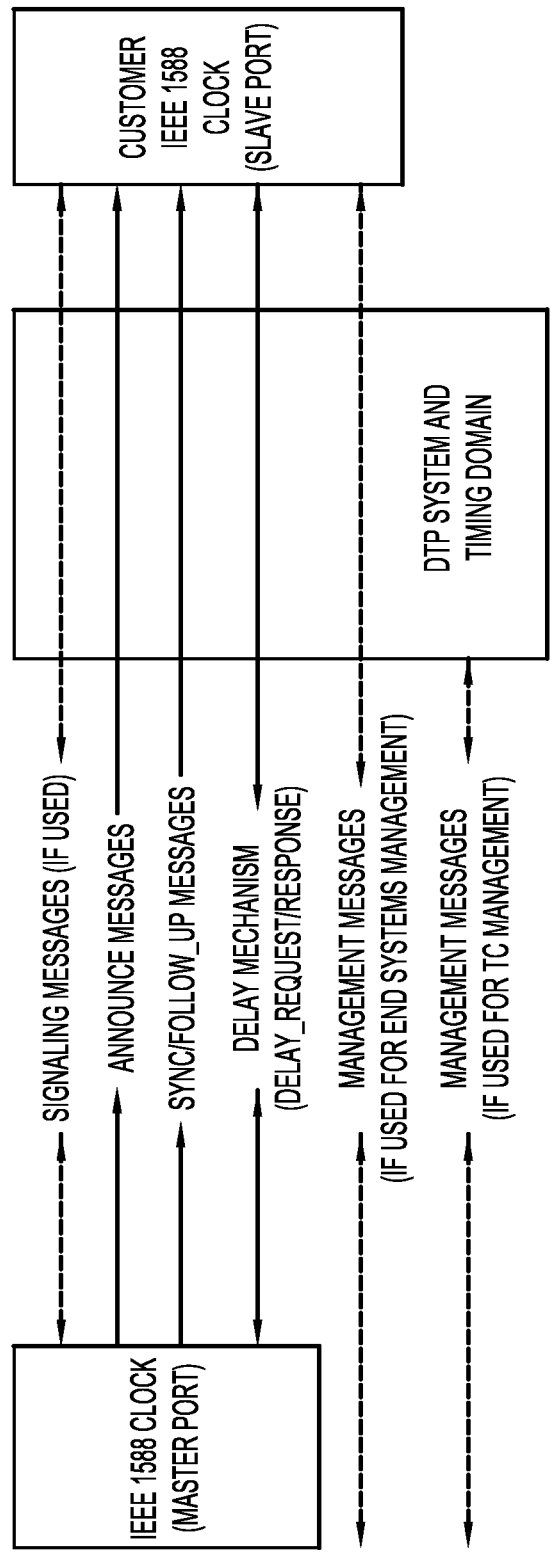
Figure 19A:
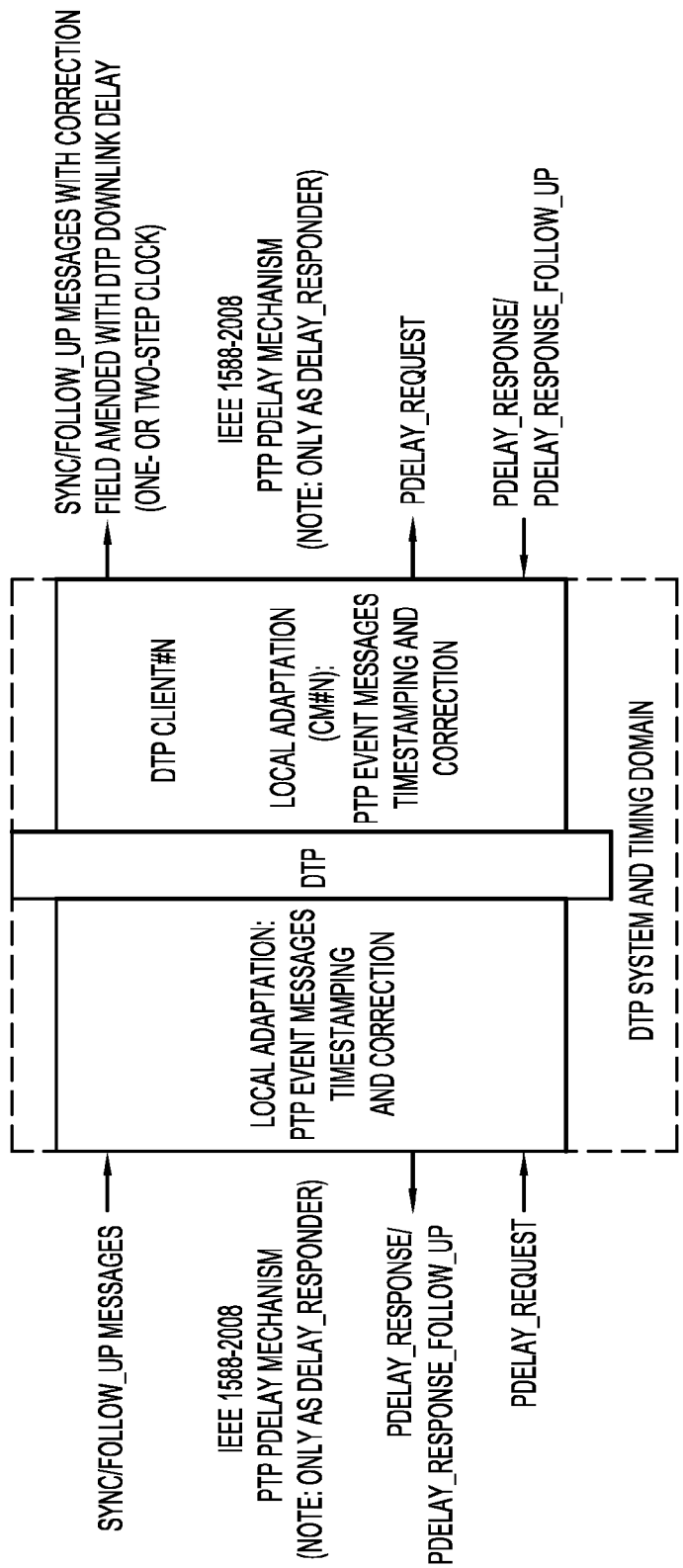
Figure 19B:
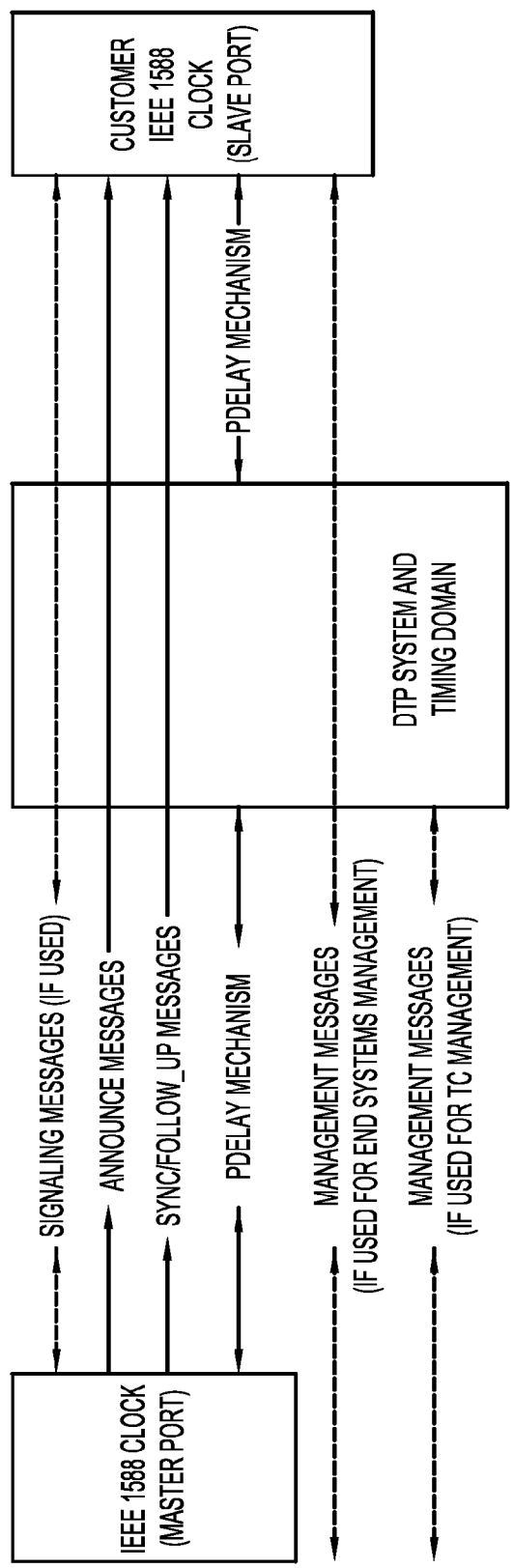

Another alternative would allow the DTP system to be independent of the timing source located in the network. In other words, the DTP system operates as transparent clock (TC), with various options for end-to-end (E2E) and peer-to-peer (P2P) TC modes. FIGS. 18A and 18B illustrate an example of E2E TC (delay mechanism), while FIGS. 19A and 19B illustrate an example P2P TC (pdelay mechanism).

It would be appreciated that the above examples of the DTP system may support simultaneously different combinations of the above and other implementations.

The above description is intended by way of example only.

What is claimed is:

1. A method comprising:
frequency synchronizing a downstream Data Over Cable Service Interface Specification (DOCSIS) Timing Protocol (DTP) client in a DOCSIS network to an upstream DTP server in the DOCSIS network;
time synchronizing the DTP client to the DTP server, the time synchronizing including:
recovering, at the DTP client, a DOCSIS timestamp transmitted from the DTP server;
receiving from the DTP server one or more DTP timestamp extensions including higher order bits configured to align the DOCSIS timestamp with a protocol time reference point associated with the non-DOCSIS timing signal and lower order bits configured to increase a resolution of the DOCSIS timestamp; and
generating a non-DOCSIS timestamp, based on the one or more DTP timestamp extensions; and
generating, based on the frequency and time, including the non-DOCSIS timestamp, of the DTP client synchronized to the DTP server, a non-DOCSIS timing signal at the output of the DTP client.

2. The method of claim 1, wherein generating a non-DOCSIS timestamp comprises:
generating Institute of Electrical and Electronics Engineers (IEEE) 1588 Precision Time Protocol (PTP) messages with a PTP timestamp structure.

3. The method of claim 1, wherein generating a non-DOCSIS timestamp comprises:
generating Network Time Protocol (NTP) packets with a NTP timestamp structure.

4. The method of claim 1, wherein generating a non-DOCSIS timestamp comprises:
generating Inter-Range Instrumentation Group (IRIG) time codes and time code structures.

5. The method of claim 1, further comprising:
calculating a true ranging offset between the DTP client and the DTP server; and
refining the accuracy of the non-DOCSIS timestamp based on the true ranging offset so as to compensate for the total round trip delay between the DTP server and the DTP client.

6. The method of claim 5, wherein refining the accuracy of the non-DOCSIS timestamp comprises:
determining, based on the true ranging offset, a packet departure time from the DTP client to the DTP server;
calculating, based on the determined packet departure time, a round trip time through the DOCSIS network; and
calculating, based on the calculated round trip time, an estimate of a downstream delay between the DTP server and the DTP client.

7. The method of claim 5, wherein calculating the true ranging offset comprises:
receiving, at the DTP client, a MAP message transmitted by the DTP server, wherein the MAP message includes an indication for the DTP client to transmit a first packet to the DTP server at a specific time;
storing the DTP server timestamp as a DTP client timestamp;
performing DOCSIS ranging to determine a specific time when the first packet should be transmitted by the DTP client so that the first packet reaches the DTP server at the specific time; and
calculating the true ranging offset based on the performance of the cable modem during the DOCSIS ranging.

8. The method of claim 1, wherein the DOCSIS network comprises a reference DTP client connected to the DTP server via a local connection, the method further comprising:
calculating a time alignment difference between the DTP server and the reference DTP client;
generating a time alignment correction factor based on the calculated time alignment difference;
transmitting the time alignment correction factor to the DTP client; and
refining the accuracy of the non-DOCSIS timestamp based on the time alignment correction factor.

9. The method of claim 1, further comprising:
synchronizing one or more of the time or frequency of the DTP server to an IEEE 1588 PTP grandmaster.

10. The method of claim 1, further comprising:
synchronizing one or more of the time and/or frequency of the DTP server to a DOCSIS Timing Interface (DTI) server.

11. The method of claim 1, wherein generating the clock signal at the DTP client comprises:
generating a clock signal in accordance with a dedicated standard timing interface comprising at least one of an Inter-Range Instrumentation Group time code B (IRIG- B) or a 1PPS signal specified by International Telecommunications Union Telecommunication Standardization Sector (ITU-T) G.8271.

12. An apparatus comprising:
a Data Over Cable Service Interface Specification (DOCSIS) Timing Protocol (DTP) client comprising:
a network interface configured to enable communications over a DOCSIS network;
a memory; and
a processor coupled to the network interface and the memory, and configured to:
frequency synchronize the DTP client with a DTP server;
time synchronize the DTP client with the DTP server, wherein to time synchronize the processor is configured to:
recover, at the DTP client, a DOCSIS timestamp transmitted from the DTP server;
receive from the DTP server one or more DTP timestamp extensions including higher order bits configured to align the DOCSIS timestamp with a protocol time reference point associated with the non-DOCSIS timing signal and lower order bits configured to increase a resolution of the DOCSIS timestamp; and
generate a non-DOCSIS timestamp, based on the one or more DTP timestamp extensions; and
generate, based on the frequency and time, including the non-DOCSIS timestamp, of the DTP client synchronized to the DTP server, a non-DOCSIS timing signal at the output of the DTP client.

13. The apparatus of claim 12, wherein the processor is configured to calculate a true ranging offset between the DTP client and the DTP server and refine the accuracy of the non-DOCSIS timestamp based on the true ranging offset so as to compensate for the total round trip delay between the DTP server and the DTP client.

14. The apparatus of claim 13, wherein to refine the accuracy of the non-DOCSIS timestamp the processor is configured to determine, based on the true ranging offset, a packet departure time from the DTP client to the DTP server, calculate, based on the determined packet departure time, a round trip time through the DOCSIS network, and calculate, based on the calculated round trip time, an estimate of a downstream delay between the DTP server and the DTP client.

15. The apparatus of claim 13, wherein to calculate the true ranging offset the processor is configured to receive at the DTP client a MAP message transmitted by the DTP server, the MAP message including an indication for the DTP client to transmit a first packet to the DTP server at a specific time, store the DTP server timestamp as a DTP client timestamp, perform DOCSIS ranging to determine a specific time when the first packet should be transmitted by the DTP client so that the first packet reaches the DTP server at the specific time, and calculate the true ranging offset based on the performance of the cable modem during the DOCSIS ranging.

16. One or more non-transitory computer readable storage media encoded with software comprising computer executable instructions and when the software is executed operable to:
frequency synchronize a downstream Data Over Cable Service Interface Specification (DOCSIS) Timing Protocol (DTP) client in a DOCSIS network to an upstream DTP server in the DOCSIS network;
time synchronize the DTP client to the DTP server, wherein the instructions to cause the processor to time synchronize include instructions to cause the processor to:
recover, at the DTP client, a DOCSIS timestamp transmitted from the DTP server;
receive one or more DTP timestamp extensions from the DTP server; and
generate a non-DOCSIS timestamp, based on the one or more DTP timestamp extensions; and
generate, based on the frequency and time, including the non-DOCSIS timestamp, of the DTP client synchronized to the DTP server, a non-DOCSIS timing signal at the output of the DTP client;
calculate a true ranging offset between the DTP client and the DTP server; and
refine an accuracy of the non-DOCSIS timestamp based on the true ranging offset so as to compensate for the total round trip delay between the DTP server and the DTP client.

17. The computer readable storage media of claim 16, wherein the instructions operable to receive the one or more DTP timestamp extensions comprise instructions operable to:
receive higher order bits configured to align the DOCSIS timestamp with a protocol time reference point associated with the non-DOCSIS timing signal; and
receive lower order bits configured to increase a resolution of the DOCSIS timestamp.

18. The method computer readable storage media of claim 16, wherein the instructions operable to generate the non-DOCSIS timestamp comprise instructions operable to:
generate Network Time Protocol (NTP) packets with a NTP timestamp structure.

19. The computer readable storage media of claim 16, wherein the instructions operable to generate the non-DOCSIS timestamp comprise instructions operable to:
generate Inter-Range Instrumentation Group (IRIG) time codes and time code structures.

* * * * *